United States Patent [19]

Irvin

[11] Patent Number: 5,129,272
[45] Date of Patent: Jul. 14, 1992

[54] CONTINUOUSLY VARIABLE TRANSMISSION

[75] Inventor: Peter J. E. Irvin, Surrey, Canada

[73] Assignee: Nutec Transmission Ltd., Laguna Beach, Calif.

[21] Appl. No.: 669,575

[22] Filed: Mar. 14, 1991

Related U.S. Application Data

[63] Continuation-in-part of Ser. No. 454,931, Dec. 22, 1989.

[51] Int. Cl.⁵ .............................................. F16H 21/42
[52] U.S. Cl. ......................................... 74/63; 74/567; 475/16; 475/162; 475/296
[58] Field of Search ........................... 74/63, 393, 567; 474/49, 50, 69, 70; 475/16, 162, 296

[56] References Cited

U.S. PATENT DOCUMENTS

| | | | |
|---|---|---|---|
| 1,435,838 | 11/1922 | Gill | 74/63 |
| 1,739,554 | 12/1929 | Lindholm | 74/53 |
| 2,069,007 | 1/1937 | Fontana | 74/393 |
| 2,183,193 | 12/1939 | Husson | 74/124 |
| 2,463,771 | 3/1949 | Hunz | 74/575 |
| 3,087,355 | 4/1963 | Bassereau | 475/16 |
| 3,490,299 | 1/1970 | Binner | 74/63 |
| 3,750,485 | 8/1973 | Blakemore | 74/63 |
| 3,913,749 | 10/1975 | Wyers | 74/63 X |
| 3,995,508 | 12/1976 | Newell | 475/50 |
| 4,181,043 | 1/1980 | Waddington | 475/16 |
| 4,411,165 | 10/1983 | Evans | 74/63 |
| 4,475,412 | 10/1984 | Evans | 74/63 |
| 4,665,762 | 5/1987 | Russell | 74/63 |
| 4,701,152 | 10/1987 | Dutil et al. | 474/70 |
| 4,800,768 | 1/1989 | Kazuta | 74/63 |

FOREIGN PATENT DOCUMENTS

| | | |
|---|---|---|
| 625053 | 2/1936 | Fed. Rep. of Germany . |
| 3711643 | 10/1988 | Fed. Rep. of Germany . |
| 437830 | 5/1912 | France . |
| 527598 | 10/1921 | France . |
| 718788 | 1/1932 | France . |
| 766638 | 7/1934 | France . |
| 282671 | 2/1931 | Italy . |
| 345007 | 12/1936 | Italy . |
| 60215 | 7/1924 | Sweden . |
| 109085 | 9/1943 | Switzerland . |
| 715863 | 2/1980 | U.S.S.R. . |

Primary Examiner—Allan D. Herrmann
Assistant Examiner—David W. Laub
Attorney, Agent, or Firm—Bull, Housser & Tupper

[57] ABSTRACT

A variable speed transmission transmits power between an input and output in which a pinion gear, a rotor and a cam are mounted for relative rotation therebetween. First and second gear rack pairs have opposite facing toothed gear racks which are spaced apart sufficiently to receive the pinion gear and cam therebetween when the pinion gear engages at least one of the gear racks, and an outer surface of the cam is adjacent at least one of the gear racks. Structure is provided to prevent contact between the rack teeth and the outer surface of the cam. First and second rack supports support the rack pairs against lateral movement to ensure full engagement between the pinion and sequentially engaged racks. The rack supports slidingly engage the rotor to transmit power therebetween in such a manner that a resultant force vector from contact between the pinion gear and gear rack passes closely adjacent a point of contact between a rack support and the rotor. Teeth of the gears have inclined tooth tip end faces to facilitate meshing.

27 Claims, 11 Drawing Sheets

CONTINUOUSLY VARIABLE TRANSMISSION

CROSS REFERENCES TO RELATED APPLICATIONS

This is a Continuation-in-Part application of co-pending application Ser. No. 07/454,931, filed 22 December 1989, and entitled "Variable Speed Transmission"

BACKGROUND OF THE INVENTION

The invention relates to a fully variable power transmission apparatus in which rotary power applied to an input member is transferred to an output member, with means to permit a continuous or "stepless" change in speed and torque between the input and output members.

Many different types of variable speed power transmissions are available, some types using trains of journalled toothed gears, or chains and sprockets, or pulleys and belts. Many types of transmissions provide a relatively limited speed range or torque ratio, with a number of pre-selected ratios provided between minimum and maximum gear ratios. Such ratios are in so-called "steps" or are discontinuous, i.e. to progress through the full range of gears a series of incremental steps must be taken, intermediate positions between the steps being unattainable. That is, this type of transmission does not provide a continuously variable speed or, torque throughout the entire range between minimum and maximum gear ratios.

While attempts have been made to produce "stepless" or continuously variable transmissions, many additional complications are usually introduced often with limitations on maximum power that can be transmitted. A stepless transmission has the advantage of providing continuous variations in torque and speed between input and output members, but usually the range of gear ratios is relatively limited compared with conventional "stepped" transmissions as previously described.

Examples of stepless gear transmissions are shown in U.S. Pat. No. 4,411,165 issued to Evans in 1983 and in U.S. Pat. No. 4,800,768, issued to Kazuta in 1989. While both of these Patents disclose stepless transmissions which Provide a relatively wide gear ratio range, in the applicant s opinion the designs appear to be limited to relatively low power applications, and it is anticipated that difficulty can be experienced in adapting the patented transmissions to heavy duty application. Both patents disclose an input pinion surrounded by four toothed racks which are connected together as two pairs of oppositely disposed racks, and which transfer power to an output rotor. Spacing between axes of the input pinion and output rotor is variable, and the transmission can be likened to an input pinion driving an output annular gear of variable diameter. The pinion is engaged by the racks in sequence which rotate thereabouts so that there is intermittent meshing between the pinion and the racks in sequence. Both patents disclose resilient means to permit the racks to move radially relative to the pinion.

One problem that appears to be common to both patents is the difficulty of ensuring smooth transfer of torque from the pinion gear to each rack in sequence. As the pinion rotates, each rack is engaged by the pinion in sequence, and thus there is constant engagement and re-engagement of racks by the pinion. Even for a constant speed ratio between the input and output members, difficulty can be experienced when the pinion gradually disengages from one rack, and re-engages with the next rack in sequence. When the gear ratio is actually changing, by changing spacing between axes of the input and output members, the difficulties of ensuring a smooth transfer of torque between the Pinion and the racks is increased. Sometimes a tooth of the pinion can come into direct tip-to-tip contact with an opposing tooth of a rack about to be engaged. If this occurs, the resilience provided in the mounting of the rack Permits the rack to move generally radially outwardly to some extent, but this movement is often insufficient to Prevent high forces from being generated between the pinion and the rack, which can cause damage to the rack. In any event, when such tip-to-tip contact occurs, an impulsive load is inadvertently applied to the rotor, causing intermittent output of power therefrom.

Furthermore, in each of the two said patents, relatively high friction forces can be generated between sliding members, with a corresponding loss of power. Furthermore, the direction of transfer of forces between some adjacent components is less than optimum, significantly increasing mechanical losses in the transmission. In addition, in the patents above, the teeth of the rack opposite to the rack in engagement with the pinion sweep across an outer surface of the cam means. Sweeping gear teeth across a cam surface can produce excessive wear in at least one of the components, which increases undesirable clearance between components, contributing to rough running of the apparatus.

SUMMARY OF THE INvENTION

The invention reduces many of the difficulties and disadvantages of the prior art by providing a "stepless transmission" of a type similar to the two patents above with improved sequential meshing of the racks with the pinion by a specific structure for mounting the racks with respect to the pinion. One means of improving meshing is to essentially prevent outwards movement of the rack teeth relative to the pinion. Another means is to Provide structure which generates forces on a particular rack as it is engaged by the pinion to move the particular rack laterally a small amount to avoid tip-to-tip contact, thus facilitating meshing of the teeth. Furthermore, sliding frictional losses are reduced considerably by improving cooperation between members transferring power from the racks to the rotor. Also force from the pinion transferred to the racks is then directed to the rotor in a more efficient manner than in the patented devices. Furthermore, means can be provided to prevent contact of the rack teeth with the outer surface of the cam, thus reducing excessive wear of one or both of these components.

A power transmission according to the invention has a body, a pinion gear mounted for rotation about a Pinion axis relative to the body, and a cam means having curved inner and outer surfaces. The cam means and the pinion gear are mounted for relative rotation therebetween. The transmission further includes first and second gear rack Pairs. Each gear rack pair has oppositely facing toothed gear racks which are spaced apart sufficiently to receive the Pinion gear and cam means therebetween when the Pinion gear fully engages at least one of the toothed gear racks, and the outer surface of the cam means is adjacent at least one of the oppositely facing toothed gear racks. The transmission also includes first and second rack support means and a rotor. The first and second rack support means support the first and second gear rack pairs respectively against lateral movement of the rack Pair relative to the respective support means. This ensures full engagement between the pinion and the respective racks sequentially as required, thus reducing Problems associated with sequential engagement between racks of the prior art. The rotor is mounted for rotation about a rotor axis and has rotor engaging means for engaging the first and second rack support means so as to transmit power therebetween.

Also, in a transmission apparatus generally as described above, Preferably, each rack support means has oppositely disposed driving sides disposed generally normally to the rack pairs mounted thereon. Each driving side has a driving side inner portion and two driving side outer portions spaced on opposite sides of the respective driving side inner Portion. The driving side outer Portions Project outwardly further from the respective driving side inner portion relative to the pinion. The rotor engaging means include four engaging surfaces disposed as a square about the rotor axis. The two driving side outer portions of each rack support means engage respective engaging surfaces of the rotor to permit relative movement along the engaging surfaces. Preferably, a resultant force vector from contact between the pinion and the respective gear rack passes closely adjacent a point of contact between an adjacent driving side outer portion and the respective engaging surface of the rotor.

Also, in a transmission apparatus generally as described above, the pinion and gear racks have teeth, some of which Preferably have obliquely inclined tooth tips. In this way, the teeth generate, oblique forces on each other if opposing tooth tips contact each other momentarily prior to full engagement with each other. The oblique forces between the teeth shift the rack teeth generally tangentially relative to the pinion teeth immediately Prior to engagement so as to facilitate smooth meshing of the teeth.

Also, in a power transmission generally as above described, means are provided for preventing contact between the rack teeth and the cam outer surface thus reducing wear thereof Preferably, the means for preventing contact comprise the cam outer surface having a guide portion and a relieved portion, and a plurality of rack tracks, each rack track extending generally adjacent rack teeth of a respective toothed rack. The rack tracks are positioned relative to the respective rack teeth so as to contact the guide portion when the respective rack teeth pass through the relieved Portion, so as to prevent contact between the rack teeth and the cam outer surface.

Furthermore, while apparatus of the above described has a relatively wide gear ratio when compared with stepless transmissions known to the inventor, with a simple modification it is relatively easy to couple together two or more generally similar transmissions in series with each other, so as to increase the available gear ratio. Such "series coupling" is effected relatively easily by providing for a first apparatus of the invention, an output structure which provides a conversion to an input structure of a second apparatus according to the invention, so that overall output from the second apparatus has a gear ration which can be considerably wider than that of one apparatus by itself. Preferably, first and second gear change means produce relative movement between the axes of the respective pinion gear and the respective rotor of the first and second apparatus respectively in such a direction that the relative from the said relative movement of the second apparatus as viewed along the axes. This produces a smoother transfer of power at the output shaft.

A detailed disclosure following, related to drawings, describes a preferred embodiment of the invention which is capable of expression in structure other than that particularly described and illustrated.

DETAILED DISCLOSURE

Figure 1:
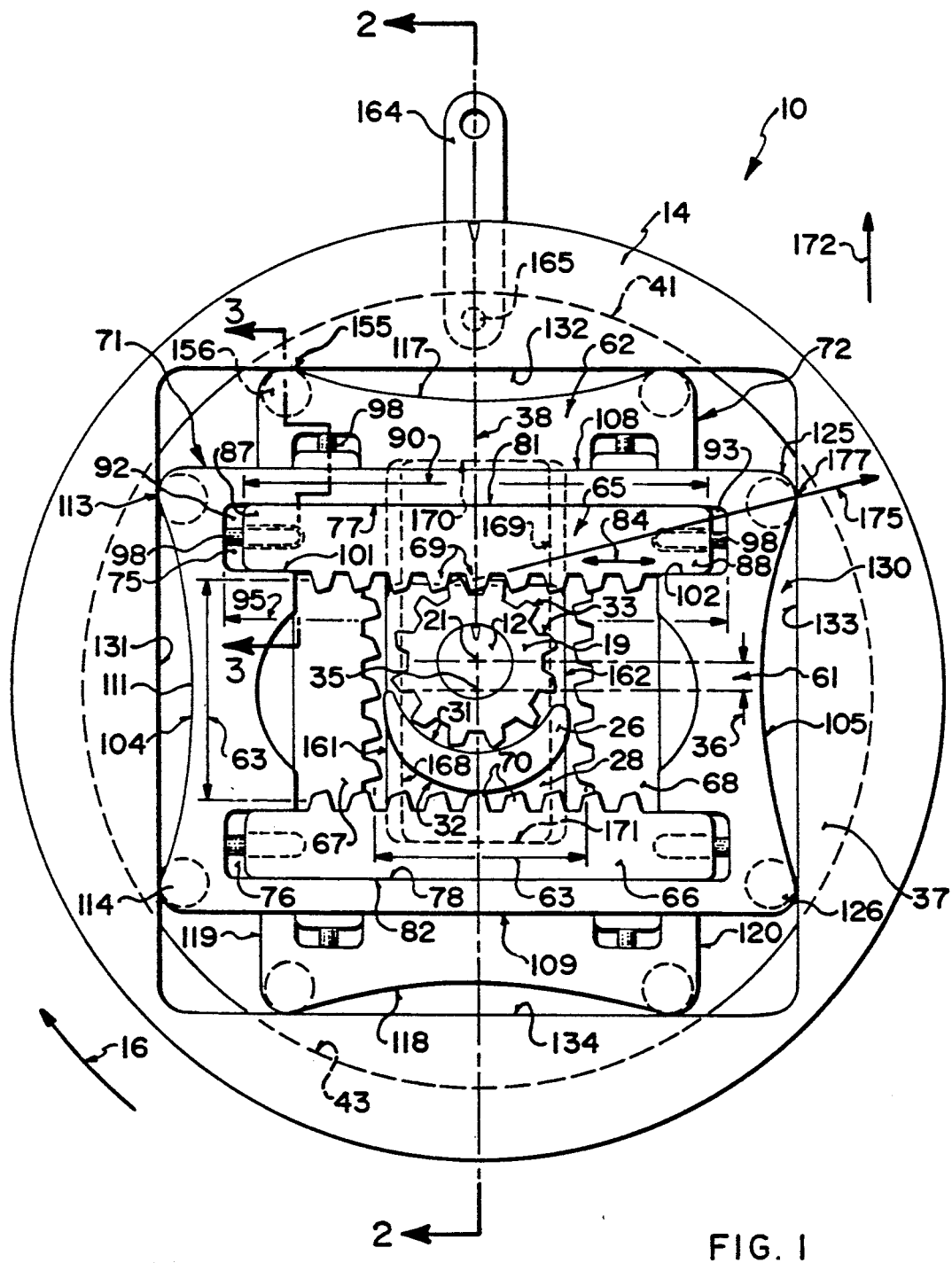
FIG. 1 s a simplified, fragmented, partially diagrammatic, sectional side elevation of a power transmission according to a first embodiment of the invention, some portions being exaggerated in size or omitted for clarity, the apparatus being shown in a narrowest gear ratio setting.
Figure 2:
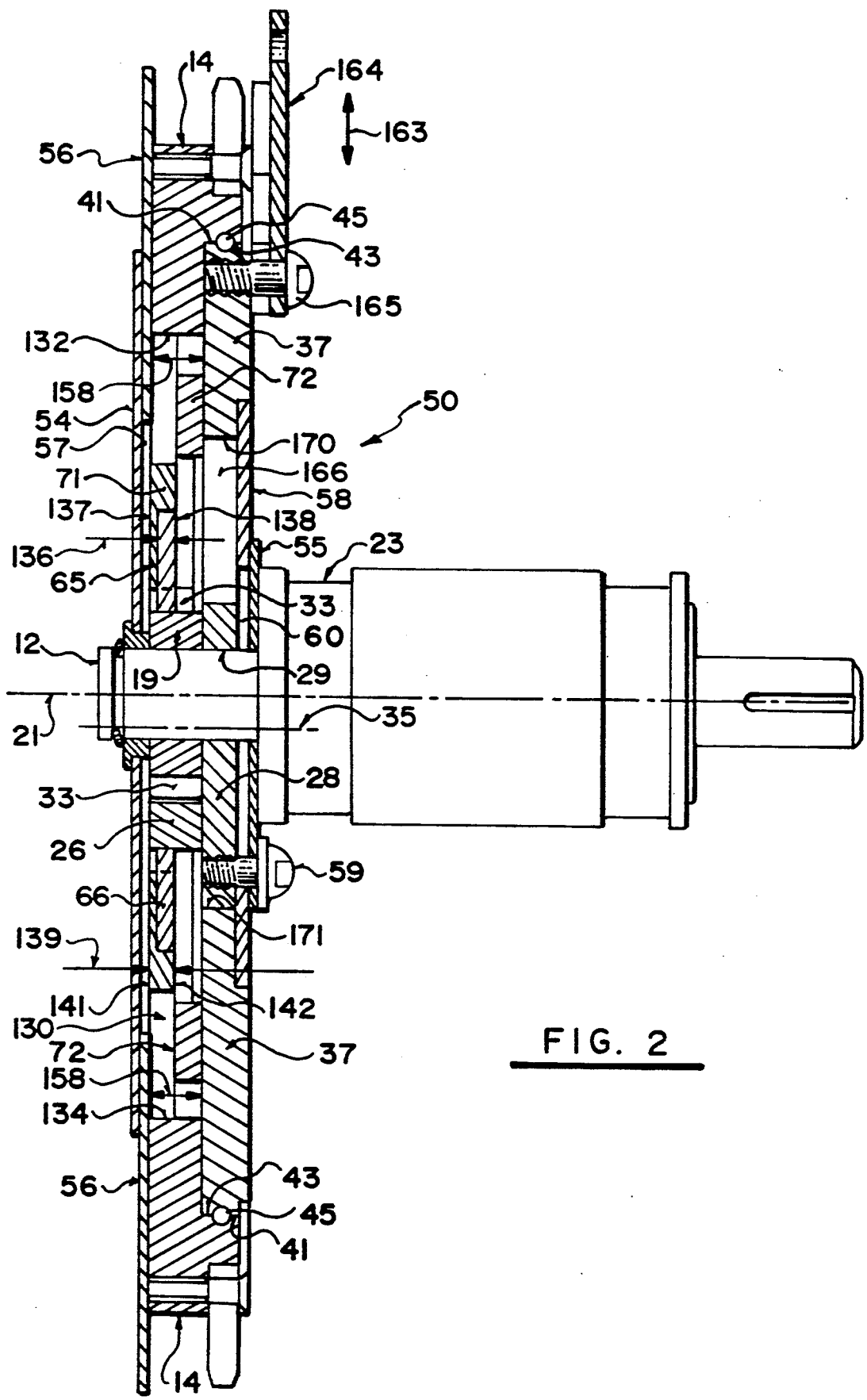
FIG. 2 is a simplified, fragmented diagrammatic section on line 2—2 of FIG. 1, some portions being exaggerated in size or omitted for clarity, the apparatus being shown in the narrowest gear ratio, FIG. 3 a simplified fragmented section on line 3—3 of FIG. 1, some portions being exaggerated in size or omitted for clarity, FIG. 4 a simplified, fragmented side elevation of teeth of a pinion gear and a gear rack in full driving engagement.
Figure 3:
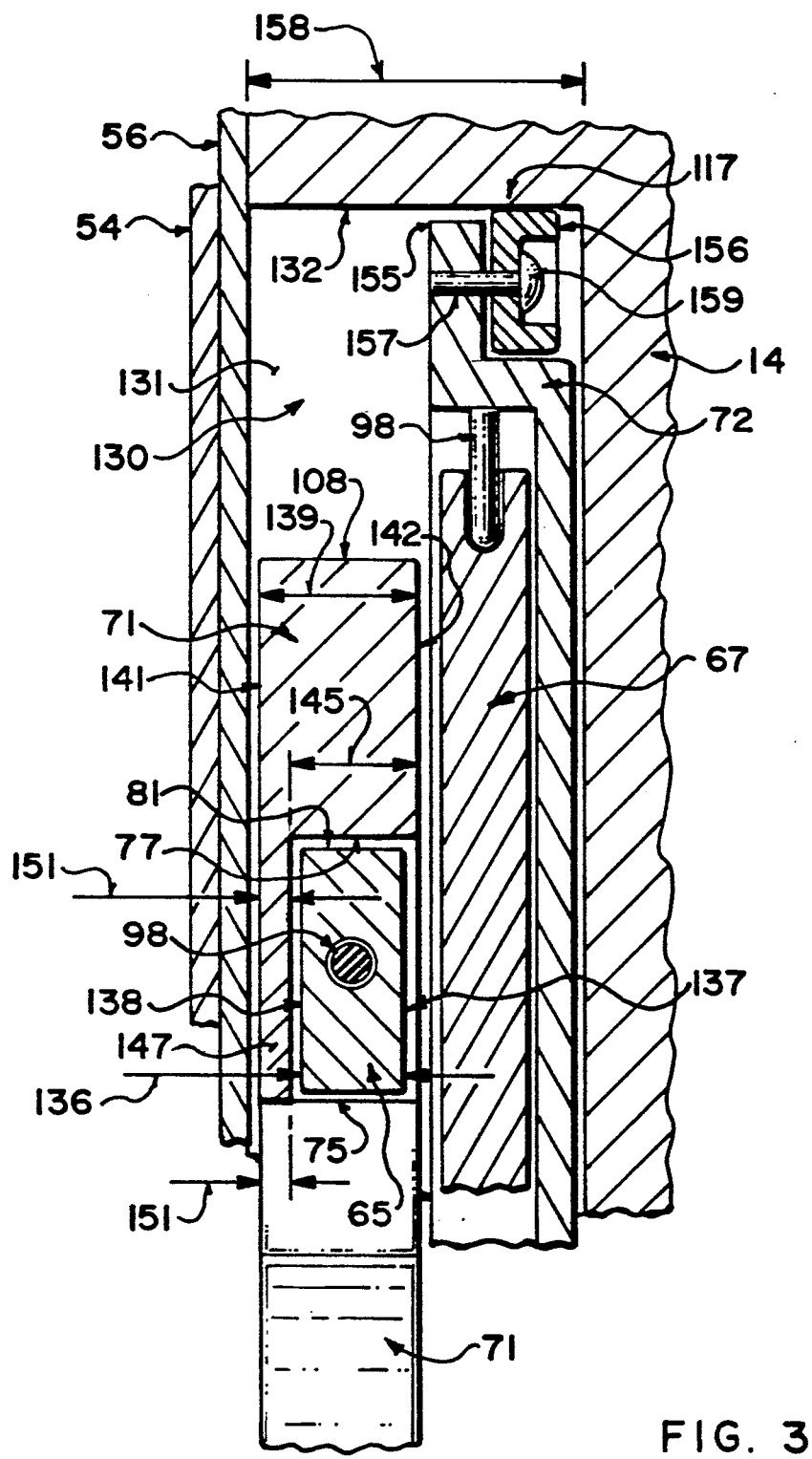

FIGS. 1 through 3

A variable speed transmission apparatus 10 according to the invention has an input or pinion shaft 12 and an output rotor 14, and thus is described initially by showing direction of power transmitted through the apparatus from the input shaft 12 to the output rotor 14. Furthermore, for convenience of description, direction of rotation of the input shaft or member 12 is shown as an arrow 16, which is also the direction of rotation of the output rotor or member 14. However, the direction of rotation of the input and output members can be reversed, can be reversed i.e., the input and output as disclosed can be interchanged. Also, for convenience of description, some components are shown to be stationary, while others rotate relative thereto. Clearly, in certain applications some of these configurations can be interchanged.

Many components of the apparatus 10 and their function resemble closely equivalent components shown in U.S. Pat. No. 4,800,768, issued to Kazuta as previously described. Consequently, the disclosure of this patent is incorporated herein by reference. However, to clarify understanding of the present invention, even those components similar to the structure shown in Kazuta will now be briefly described. The apparatus includes a Pinion gear 19 secured to the shaft 12 for rotation therewith about a pinion axis 21. The shaft 12 is mounted for rotation in a stationary shaft journal 23, and receives power from an external source, not shown.

Referring to FIG. 1, the apparatus 10 also includes a crescent-shaped cam means 26 and a generally rectangular cam mounting means 28 which mounts the cam and has a bore 29 to journal the cam mounting means on the shaft 12. Thus the cam means and the pinion gear are mounted for relative rotation therebetween. The cam means 26 has curved inner and outer cam surfaces 31 and 32, the inner surface 31 being concentric with the pinion axis 21 and being spaced from teeth 33 of the pinion to permit relative rotation therebetween.

The rotor 14 is an annulus and is mounted for rotation about a rotor axis 35 on a disc-like rotor mounting means 37. The rotor axis 35 is spaced from the pinion axis 21 by an axis spacing 36 which, in FIG. 1, is a minimum axis spacing which represents the narrowest gear ratio attainable by the apparatus As will be described, the spacing 36 between the axes 21 and 35 is variable, and variation of the axis spacing varies gear ratio between the pinion and rotor. The rotor mounting means 37 has a circular rotor bearing surface 41 which is concentric with the axis 35 and complementary to an annular bearing surface 43 of the rotor. Preferably, a plurality of bearing elements such as balls or rollers 45 are provided to reduce friction of the rotor rotating relative to the rotor mounting means. A cam axis 38 coincides with a diameter of the pinion and rotor and thus intersects the Pinion axis 21 and the rotor axis 35 and passes through a generally mid position of the cam means 26. The axis 38 clearly serves as a general axis of symmetry of the apparatus, with the exception of the cam means as will be described.

As best seen in FIG. 2, the apparatus has a body 50 which includes the rotor mounting means 37 and also stationary circular first and second body side members 54 and 55 respectively, which have undesignated aligned central clearance openings therein to receive the pinion shaft 12. An outer annular plate 56 is secured to the rotor 14 to rotate therewith, and has an inner clearance opening 57 which is sealed by the first body side member 54, to Provide an adequate overlap therewith, similarly to the Kazuta patent. A bolt 59 secures the second body side member 55 to the cam mounting means 28 and also to the stationary shaft journal 23. An inner annular plate 58 is secured to the rotor mounting means 37 so as to move therewith, has a clearance opening 60 which is sealed by the second body side member 55 in a manner similar to that described with reference to the Kazuta patent. Thus, the side members 54 and 55, the cam mounting means 28 and cam means are secured relative to the stationary shaft journal. As will be described, the rotor mounting means 37 is non-rotatably movable relative to the body and journal 23 to permit variation in the axis spacing 36.

As best seen in FIG. 1, the apparatus includes first and second gear rack pairs 61 and 62 respectively, the pairs being disposed perpendicularly to each other and surrounding the Pinion gear 19. The first gear rack pair has oppositely facing toothed gear racks 65 and 66 and the second gear rack pair has similar toothed gear racks 67 and 68 respectively. The gear racks and pinion gear have similar meshing teeth, in which the racks are engaged sequentially by the pinion gear as will be described. Inter-rack spacing 63 between opposite gear racks of a pair is equal and critical, and the Present invention provides a means of ensuring that there is negligible variation in the said spacing. The gear racks of a particular Pair are spaced apart at the spacing 63 which is sufficient to receive the pinion gear 19 and the cam means 26 therebetween when the pinion gear fully engages at least one of the toothed gear racks, for example the gear rack 65 as shown, and the outer surface 32 of the cam means is in contact with at least one of the oppositely facing toothed gear racks, in this instance the gear rack 66. Thus, teeth 69 of the rack 65 are in engagement with the teeth 33 of the pinion, and at least one tooth of teeth 70 of the rack 66 is in contact with the outer surface 32 the cam means.

Again referring to FIG. 1, the apparatus 10 includes first and second rack support means 71 and 72 respectively for supporting the first and second gear rack pairs 61 and 62 respectively against lateral movement of the rack Pair relative to the respective support means. This is to maintain the spacing 63 constant, which ensures full engagement between the Pinion and respective rack, the engagement occurring sequentially as will be described. The first rack support means 71 has a pair of parallel recesses 75 and 76 respectively disposed on opposite sides of the rack support means and spaced apart on opposite sides of the pinion. The recesses 75 and 76 retain the respective toothed racks 65 and 66 and have respective outer bearing surfaces 77 and 78 which are accurately linear and smooth to reduce sliding friction thereon. The racks 65 and 66 have similar linear outer bearing surfaces 81 and 82 respectively disposed along outer edges of the respective racks opposite to the teeth 69 and 70 of the racks. The outer bearing surfaces 81 and 82 of the gear racks 65 and 66 are in engagement with the outer bearing surfaces 77 and 78 of the respective recesses of the rack support means 71.

The rack 65 has oppositely disposed rack end portions 87 and 88, space between the end portions defining length 90 of the rack. The recess 75 has a pair of oppositely spaced recess end portions 92 and 93 for receiving the rack end Portions 87 and 88 respectively. Space between the recess end Portions 92 and 93 defines length 95 of the recess, which is greater than the length 90 of the rack retained therein, so as to permit limited longitudinal movement of the rack relative to the rack recess Per arrow 84. The ends 87 and 88 of the rack 65 have axially aligned openings which receive similar elongated resilient members 98 therein. Thus a resilient means, which can be made from an elastomeric or rubber compound, is mounted at each end of each rack, each resilient member cooperating with an adjacent end portion 92 and 93 respectively of the rack recess so as to apply an inwards axial force to the rack. The inwards force applied at one end of the rack is opposed by an opposite inwards force at an opposite end of the rack, which tends to center the rack within its recess. Preferably, the length of the recess is slightly more than one tooth width longer than the rack. Thus, when the rack is centered in the recess, it can move in either direction along the recess approximately one half of the tooth width.

The end portions 92 and 93 of the recess 75 have inner edge portions 101 and 102 disposed generally oppositely to the outer bearing surface 77 of the recess. Space between an inner edge portion of the recess and an oppositely facing adjacent end Portion of the outer bearing surface of the recess is essentially equal to transverse width of a respective end Portion of the rack. There is clearance sufficient only for axial movement of the rack with negligible lateral movement of the rack relative to the recess, thus maintaining the spacing 63 constant for reasons to be described.

The rack 66 is similarly resiliently mounted in the respective recess 76 by a similar structure and is not described. The racks 67 and 68 are similarly resiliently mounted in respective recesses within the second rack support means 72 and are also not described.

The first rack support means 71 is generally rectangular, and has oppositely disposed, slightly inwardly curved driving sides 104 and 105 disposed generally normally to the racks 65 and 66 mounted thereon. The support means 71 also has a pair of oppositely disposed straight, interconnecting sides 108 and 109 which are parallel to the racks 65 and 66 and interconnect the driving sides. The driving side 104 has a driving side inner portion 111, and two driving side outer portions 113 and 114 spaced on opposite sides of the inner portion 111. The driving side outer portions project further outwardly from the inner side portion 111 relative to the pinion and preferably have bearing means to reduce friction and wear as will be described. It can be seen that the driving side 105 is generally similar to the driving side 104 and thus both driving sides are generally concave so as to extend smoothly inwardly to the respective driving side inner portion from the two respective driving side outer portions thereof.

The second rack support means 72 is generally similar to the first rack support means 71 and thus has similar curved driving sides 117 and 118 disposed generally normally to the rack pair 62 mounted thereon, and interconnected by straight interconnecting sides 119 and 120 which are parallel to the rack pair 62. While the driving sides are shown to be concave, any shape which has outer portions projecting further outwardly than the inner portions thereof will suffice.

The rotor 14 has a main recess 130 to serve as a rotor engaging means, and is defined partially by four engaging surfaces 131 through 134 disposed as a square symmetrically about the rotor axis 35. The two driving side outer portions 113 and 114 of the driving side 104 are in contact with the engaging surface 131 of the rotor. Similarly, outer Portions 125 and 126 of the driving side 105 contact the engaging surface 133 of the rotor. Corresponding outer portions of driving sides 117 and 118 of the second rack mounting means 72 contact the engaging surfaces 132 and 134 of the rotor as shown partially in FIG. 1. Space between the outer portions of each rack support means, or, if Provided, the bearing means thereof, is closely matched to space between oppositely facing engaging surfaces of the rotor to essentially eliminate any relative rotation therebetween, to reduce the chances of "binding" of the rack support means and to limiting the movement thereof to smooth longitudinal movement along the engaging surfaces.

As seen in FIG. 3, the rack 65 has a thickness 136 defined by space between outer and inner side faces 137 and 138 thereof. Also the rack support means 71 has a thickness 139 defined by space between opposite side faces of the rack support means, namely space between an outer side face 141, and an inner side face 142. The recess 75 has a depth 145 less than the thickness 139 of the rack support means. The recess 75 has a recess rear face portion 147 which engages the inner side face 138 of the rack 65. The rear face portion 147 has a thickness 151 which is no greater than difference between the thickness 139 of the rack support means and the thickness 136 of the rack. Thus, when the rack 65 is received in the rack recess 75, the outer side face 137 of the rack does not project beyond, and preferably is slightly recessed with respect to, the adjacent inner side face 142 of the rack support means.

The above relative dimensions provide a dimensional relationship for a rack and its respective rack support means, and a similar dimensional relationship relates to the rack 66 in its recess 76, and the racks 67 and 68 in respective recesses 153 and 154 in the second rack support means 72. As seen in FIG. 3, the recesses of second rack support means 72 face in an opposite direction than the recesses of the first rack support means. In this way, outer faces of the racks 67 and 68 of the second rack support means are closely adjacent outer faces of the racks 65 and 66 of the first support means. This results in the recess rear face portions of each rack support means being disposed oppositely from each other to be exposed on the outside of the pair of rack support means which constitute a self-contained "package" of components for assembly, which are quite well protected. As seen also in FIGS. 2 and 3, the engaging surfaces 132 and 134 of the rotor 14 have a width 158 at least equal to sum of the thicknesses of the first and second rack support means so as to provide adequate engagement therewith.

From the above, it can be seen that the rack pairs of the present invention are mounted in respective rack support means to cooperate with the rotor and the pinion in a manner quite different from that shown in the patents to Evans and Kazuta. In both said patents, the rack means are resiliently mounted to Permit some relative lateral movement of the rack, that is movement of the rack that has a generally radial component relative to the Pinion gear during engagement. Such generally radial movement relative to the pinion gear has been shown to increase the risk of head-to-head contact between teeth of the pinion and a rack means about to be engaged, as will be shortly described.

As best seen in FIGS. 1 and 3, the driving side 117 of the second rack support means 72 has an outer portion 155 Provided with a roller 156 to serve as the bearing means as previously described. The roller 156 is journalled on an axle 157 secured in a recess of the outer Portion 155, and an axle stop 159 retains the roller on the axle. A portion of the roller projects beyond the outer portion 155 to contact the engaging surface 132 of the rotor. The three remaining outer portions of the rack support means 72 are similarly provided with rollers to serve as bearing means, which are shown in broken outline. Similarly the outer portions 113, 114, 125 and 126 of the rack support means 71 are also supplied with similar rollers or equivalent means to reduce sliding friction and wear of the rack support means as it moves along the engaging surface as will be described with reference to FIGS. 6 and 7. In most of the following description, for simplicity the rollers adjacent the outer portions of the rack support means are not referred to specifically.

Similarly to the said Kazuta patent, as best seen in FIG. 1 the cam mounting means 28 of the present invention has spaced parallel mounting sides 161 and 162 which are disposed parallel to the cam axis 38 which passes through the pinion axis 21. The rotor mounting means 37 has an elongated rectangular recess 166 having a pair of spaced parallel recess side walls 168 and 169 parallel to the axis 38, and spaced Parallel recess end walls 170 and 171 perpendicular to the axis 38, the walls being shown in broken outline. The side walls 168 and 169 engage the mounting side walls 161 and 162 of the cam mounting means 28 to permit relative axial sliding movement between the rotor mounting means 37 and the cam mounting means 28 along the cam axis 38. Because the rotor axis is fixed relative to the rotor mounting means, this axial movement of the rotor mounting means varies the spacing 36 between the pinion axis 21 and the rotor axis 35. A gear shift connector 164 is a short strip aligned with the cam axis 38 and connected to the rotor mounting means 37 by a bolt 165. Axial movement of the strip 164 per a double-headed arrow 163 similarly shifts the rotor mounting means with respect to the cam mounting means 28 so as to vary spacing 36, as will be described with reference to FIG. 4. Thus, the rotor mounting means 37 is non-rotatably mounted relative to the cam means 26 but can move axially relative thereto. The mounting sides 161 and 162, and the recess side walls 168 and 169 have complementary guide means to maintain the axial movement within a main plane of the rotor 14. Thus the rotor mounting means 37 is mounted for guided movement along the cam axis 38 with negligible lateral deviation therefrom. It is seen that the rotor itself is movable along a radius Passing through the pinion axis.

As seen in FIG. 1, the curved outer surface 32 of the cam means 26 is asymmetrical with respect to the cam axis 38. This contrasts with the cam means shown in the two prior art patents which are symmetrical with respect to the corresponding axis. The surface 32 is asymmetrical because the gear racks have teeth which are asymmetrical and have obliquely in-lined tooth tips as will be described with the reference to FIGS. 5 and 6.

FIGS. 1 AND 4

The teeth of the gear racks 65 through 68, and the teeth 33 of the pinion have generally standard involute tooth form for driven or driving faces of the teeth, with modified tooth tips as will be described with reference to FIG. 7. Face Profiles of the teeth function in a normal manner as below.

Figure 4:
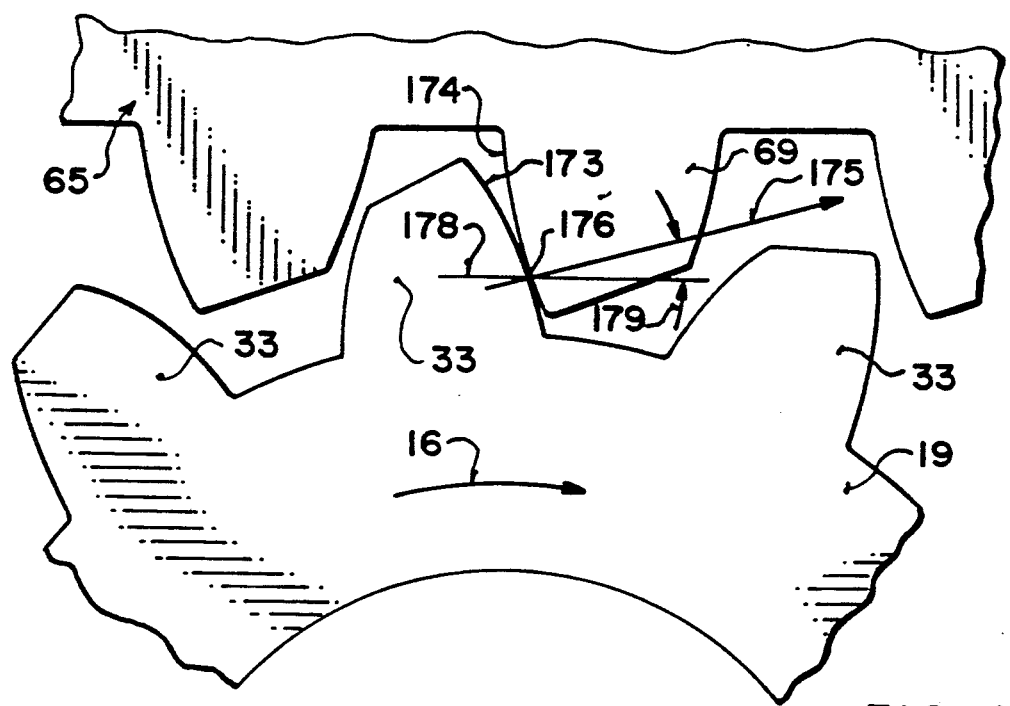

Referring particularly to FIG. 4, a known resultant force vector 175 is fendrated at a point of contact 176 of a side 173 of a Particular driving tooth 33 of the pinion gear 19 with a side 174 of an engaged driven tooth 69 of the respective rack 65. As seen in FIG. 1, the vector 175 passes closely adjacent a point of contact 177 between the adjacent driving side outer portion 125 and the respective engaging surface 133 of the rotor. As is well known, the angle of the resultant force vector is dependent on the "pressure angle" of the involute tooth form, which in this instance is 20 degrees. Consequently, the resultant force vector 175 is inclined at an angle 179 of 20 degrees to a tangent 178 passing through the point of contact 176 of the teeth, i.e. it is inclined at 20 degrees to a line normal to the cam axis 38 or is inclined at 20 degrees to a longitudinal axis of the rack. Clearly, there will be some variation in the actual direction of the resultant force vector and the point of contact 177 is selected to be generally in line with the resultant force. This enables the force from the pinion, applied to the rack and thence to the rack support means to be applied at an essentially maximum radius from the pinion axis, thus ensuring essentially optimum transfer of force in the pinion to the rotor. This is a considerable improvement of driving force application and direction when compared with the said prior art.

As will be described with reference to FIGS. 5 and 6, the resultant force vector 175 can be resolved into two components of force, namely a major component disposed at 90 degrees to the engaging surface 133 which applies a driving force to the rotor to generate torgue, and a minor component parallel to the engaging surface 133 which applies a force to the rack support means 71 in the direction of an arrow 172. When the Pinion first engages the rack 65, the first rack support means initially moves relative to the engaging surface 133 in direction of the arrow 172, and thus is assisted by the minor component of force.

FIG. 5

The apparatus 10 is shown in a widest gear ratio configuration between the rotor and pinion in which the pinion and rotor axes 19 and 35 are spaced apart by a maximum spacing 180. Similarly to the apparatus described in the Kazuta patent aforesaid, the gear ratio of the present invention can be changed by actuating the gear ratio change means or shift connector 164 which causes the rotor to shift relative to the pinion by relative sliding between the sides 161 and 162 of the cam mounting means, and the side walls 168 and 169 of the rectangular recess in the rotor mounting means As previously described, the rotor can shift diametrically relative to the rotor mounting means and attain any position intermediate the minimum and maximum spacing between the axes 21 and 35, to attain any intermediate gear ratio as in a "stepless transmission".

The resultant force vector 175, generated by contact between the Pinion teeth 33 and the rack tooth 69 again passes closely adjacent the outer portion 125 of the driving side 105 where it contacts the engaging surface 133 of the rotor. Clearly, as the rack support means 71 moves relative to the rotor 14, the point of contact 177 similarly moves, and the force vector 175 moves with it. Thus, for the two extreme positions of the rack support means with respect to the rotor, as shown in FIGS. 1 and 5, the point of contact 177 is intersected by, or is closely adjacent, the force vector 175, thus ensuring efficient transfer of force to the rotor.

As briefly described previously, the resultant force vector 175 has a major force component 191 inclined normally to the engaging surface 133 of the rotor, and a minor force component 192 inclined Parallel to the surface 133. As the pinion rotates and first drives the rack 65, the minor force component 192 applies a force to the rack support means 71, which initially moves in direction of the arrow 172 until the interconnecting side 108 contacts the engaging surface 132 of the rotor as shown in FIG. 5. This contact occurs when the pinion is about half-way along the rack 65 and represents the outer limit of travel of the rack support means 71 with respect to the rotor. The side 108 remains in contact with the surface 132 until the transfer of force between the rack 65, which is presently engaged by the pinion, to a following rack 67, which is about to be engaged by the pinion, as will be described with reference to FIG. 6. It is added that the interconnecting sides of the rack support means only contact the engaging surfaces of the rotor when in the widest gear ratio setting. For a narrower ratio (eg. as shown in FIG. 1) the displacement of the rack support means relative to the rotor is considerably reduced and the rack support means reciprocate between close outer limits without the interconnecting sides contacting the engaging surfaces The rotor has a rotor index mark 181, and the Pinion has a pinion index mark 182, shown in a datum position in which the two marks are coincident with the cam axis 38, and are both positioned in a "12 o'clock" Position. This establishes a datum from which the gear ratio is to be determined, with reference to FIG. 6.

FIGS. 5 AND 6

Figure 5:
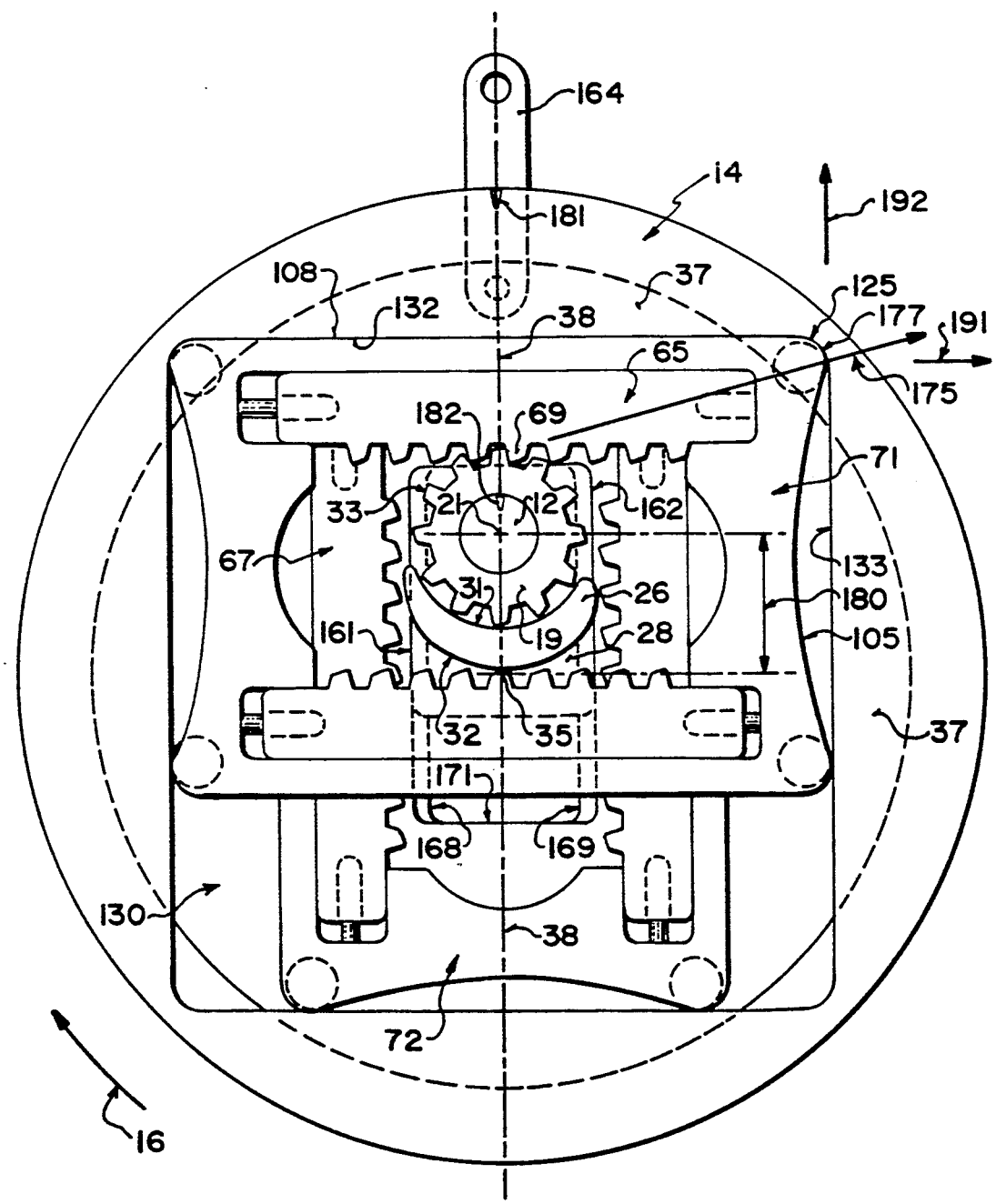
FIG. 5 is a simplified, fragmented diagrammatic side elevation of the apparatus shown with the pinion engaging a single rack, the apparatus being shown in a widest gear ratio setting.

In FIG. 5, the index marks 181 and 182 are shown in initial positions on the axis 38, i.e. both marks are shown at 12 o'clock. In FIG. 6, the pinion gear 19 has rotated through an angle 183 so that the pinion mark 182 has assumed a new position 182.1 at approximately 4 o'clock. In consequence, the rotor 14 has rotated through an angle 184 and the index mark 181 has assumed a new position 181.1 at approximately 2 o'clock. The gear ratio between the two marks is thus approximately 3:1, which represents the widest gear ratio for this specific example as described, in which the pinion axis 21 is spaced from the rotor axis 35 by the maximum axis spacing 180. Clearly, increasing diameter of the rotor and lengths of the engaging surfaces 131-134 of the rotor would increase this ratio.

Figure 6:
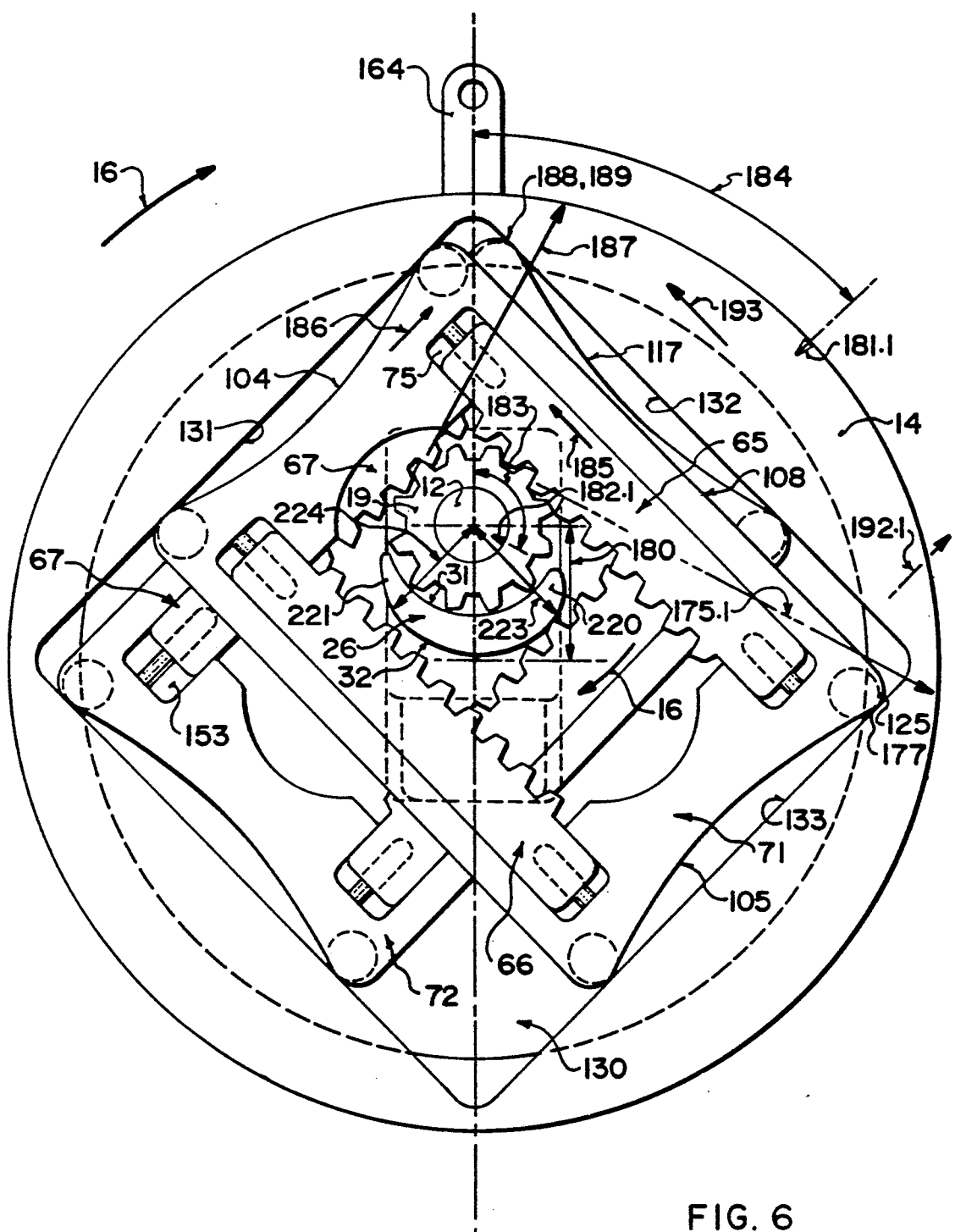
FIG. 6 is a simplified, fragmented diagrammatic side elevation of the apparatus shown with torque momentarily being transferred from one rack to an adjacent rack, with the apparatus being in the widest gear ratio setting and rotated from the position shown in FIG. 5.

In FIG. 6, the pinion gear 19 is shown in transition and is essentially simultaneously disengaging from the "leading" rack 65, and engaging the "following" rack 67, which is the next rack in sequence as the rotor rotates per the arrow 16. A very short period of time before the configuration shown in FIG. 6, the rack 65 was under load, the interconnecting side 108 contacted the surface 132 and the resultant force vector 175.1, shown in broken outline, passed closely adjacent the point of contact 177 of the outer portion 125 with the engaging surface 133 of the rotor recess. When the rack 65 is unloaded from force from the pinion gear, the rack moves in direction of an arrow 185 to be re-centered within the respective recess 75 due to the resilient means acting at opposite ends thereof. In contrast, after the rack 67 has been synchronized for smooth meshing with the pinion and is subjected to force the rack 67, the rack 67 moves in a direction of arrow 186 to be moved to a right hand end of its respective recess 153, as viewed in FIG. 6. A second resultant force vector 187 from contact between the pinion gear 19 and the rack 67 passes closely adjacent a point of contact 189 between an outer portion 188 of the driving side 117 of the second rack support means 72 and the engaging surface 132 of the rotor 14.

Referring again to FIG. 6, just prior to the relative positions as shown, the resultant force vector 175.1 from contact between the Pinion and the rack 65 has a minor component of force 192.1 acting in direction as shown. This minor component acts on the rack support means 71 to hold it against the surface 132. As the pinion disengages the rack 65 and starts to engage the rack 67, the minor component is reduced to zero and the support means 71 reverses direction and moves away from the engaging surface 133 as shown. When force from the pinion is fully transferred to the rack 67, the resultant force vector 187 has a minor force component 193 which acts on the second rack support means 72, moving it in direction of the arrow 193, until it contacts the engaging surface 131 of the rotor.

Thus, in all positions of the rack support means, the resultant force vector generated from contact between the pinion and rack teeth acts to transfer force from the Pinion and rack to the rotor at a generally enhanced leverage position from that shown in the previous patents. Also, in all gear ratio settings, a minor component of force of the resultant force vector initially acts on the particular rack support means so as to assist in moving the rack support means in the direction of the minor component until an outer limit of travel of the rack support means is reached. This initial direction is in the same direction of movement of the rack support means along the engaging surface due to operation of the apparatus. Thus, the minor force component, which is inevitable in any gear transmission of this general type, for a major Portion of the operation acts on the rack support means in a direction so as to assist in movement of the rack support means.

In FIG. 6, it can be seen that the pinion 19 is meshed instantaneously with teeth of the adjacent racks 65 and 67. If the apparatus were stopped in this configuration, because the Pinion engages both racks, relative lateral motion between the Pinion and racks is prevented and thus the rotor cannot be shifted with respect to the cam mounting means. Thus, when the apparatus is stationary in this "double meshed" configuration, the gear ratio cannot be changed. In practice, even though double meshing occurs four times per revolution of the rotor, it does not appear to be a problem as the apparatus quickly attains a configuration in which the gear ratio can be changed.

FIGS. 6 AND 7

FIG. 6 shows a driving configuration an instant of time after transfer of force between adjacent racks 65 and 67, in which teeth of the pinion 19 have fully engaged the following rack 67. In an ideal situation with accurately manufactured components, smooth transfer of drive between the leading rack and the following rack can occur with negligible interference between the teeth. However, in some circumstances tip-to-tip contact between teeth can occur momentarily prior to full engagement of the teeth. The present invention provides tips of the teeth with a modified form or geometry which is designed to essentially eliminate the possibility of damage resulting from tip-to-tip contact between teeth. With the Present invention, if tip-to-tip contact occurs, it occurs for a fraction of a second only under negligible load, and results in relative movement between the rack teeth and pinion teeth, so that synchronized meshing can occur before a full load is applied to the following rack which is just being engaged.

In contrast, in Prior art structures if tip-to-tip contact between teeth occurs for a sustained length of time, full load was applied to the following rack with a considerable magnification of force from the pinion tooth to the rack tooth, commonly resulting in damage to the rack, and possibly the pinion. Thus sustained tip-to-tip contact of prior art devices must be eliminated for efficient use of the Present mechanism, and the inclined tooth tips of the present invention as will be described alleviate this problem.

Figure 7:
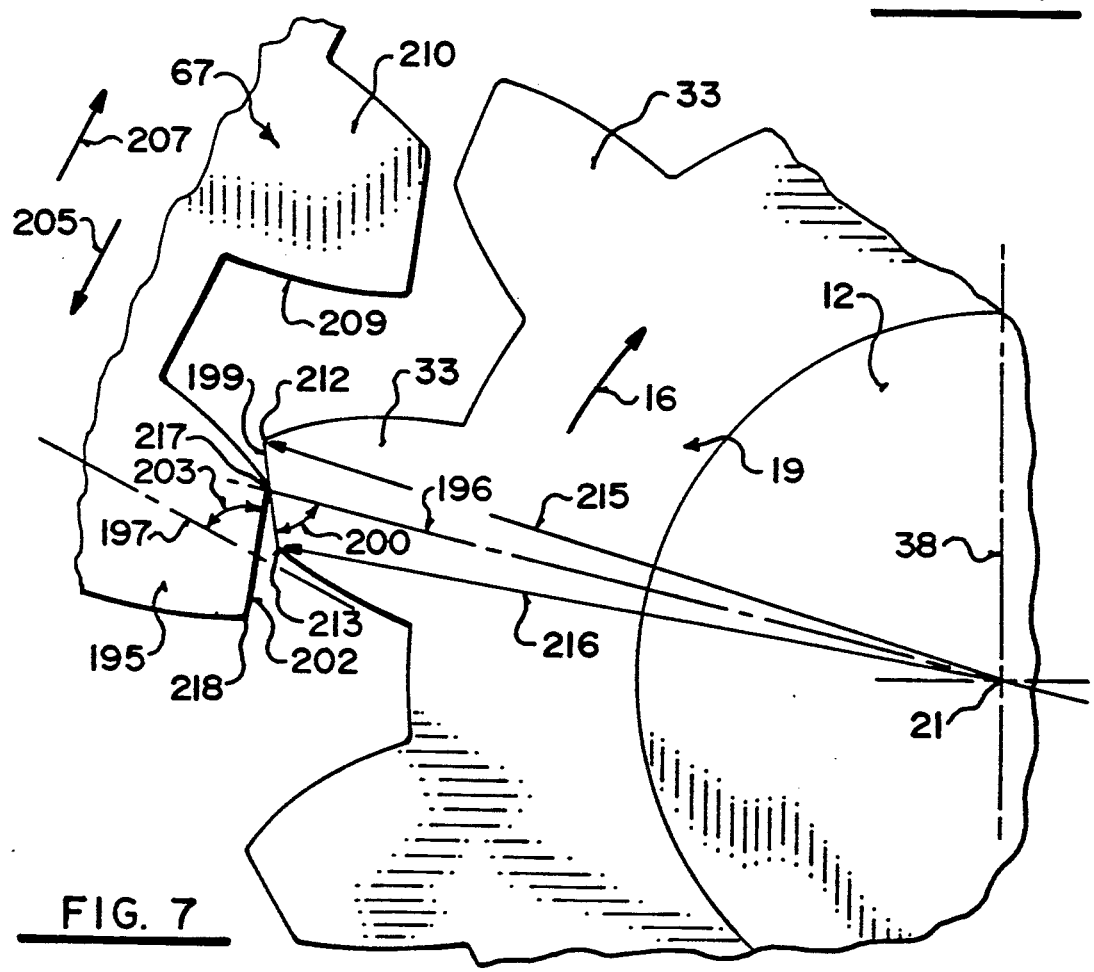
FIG. 7 is a simplified, fragmented side elevation of teeth of the pinion gear and rack shown in tip-to-tip contact momentarily prior to full engagement between the teeth.

FIG. 7 shows instantaneous tip-to-tip contact between a typical pinion tooth 33 and a typical rack tooth 195 of the rack 67. The teeth 33 and 195 have respective main longitudinal axes 196 and 197 respectively, the axis 196 being a radial axis passing through the pinion axis 21 and the axis 197 being disposed normally to a longitudinal axis at the rack 67, not shown. The pinion tooth 33 has a tooth tip end face 199 which is inclined at an angle 200 to the axis 196. The rack tooth 195 has a tooth tip end face 202 which is inclined at an angle 203 to the axis 197. It can be seen that the tip end faces of teeth are obliquely inclined and generally straight, and radiused at opposite ends thereof to blend smoothly with adjacent faces of the teeth.

As shown in FIG. 6, as the pinion transfers force from the rack 65 to the rack 67, in some instances initial contact between the pinion teeth and the teeth 195 of the following rack to be engaged can be generally of the type shown in FIG. 7. The obliquely inclined tooth tips are shaped relative to each other so as to generate oblique forces on each other if opposing tooth tips contact each other momentarily prior to full engagement with each other. As can be seen, oblique forces are generated on the tooth tiP end face 202 which shift the rack 67 generally tangentially per an arrow 205 relative to the Pinion teeth This shift is generally "in reverse" to normal rack movement and occurs immediately prior to full engagement of the teeth so as to facilitate the meshing of the teeth The rack 67 shifts initially rearwardly because the pinion gear 19 is the input and is rotating at a constant velocity. Because the rack 67 is resiliently mounted, initially the rack is free to shift to accommodate misalignment of the teeth by shifting axially relative to the respective rack support means. The resilient means, which otherwise tend to center the rack within its recess, thus yield to accommodate the forces and provide limited rearward axial shifting of the rack in response to the oblique forces generated on the tooth tips. In most situations of even slight tip-to-tip contact, the rack would tend to shift in direction of the arrow 205 to permit the pinion tooth 33 to continue its rotation whereupon it assumes a position forward of the said tooth 69, to attain a relative Position as shown in FIG. 4. The resilient means cooperating with the rack would thus be required to allow the rack to shift approximately one half tooth width from center, to permit such engagement, after which the rack end portion contacts and is held against the recess end portion.

After the rearward shifting of the rack, a driving force from the pinion is applied., to a side 209 of an adjacent tooth 210 which shift the rack 67 in direction of an arrow 207 which is opposite to the arrow 205. Thus, from the first instance of tip-to-tip contact between the teeth, the force acting on the rack 67 shifts from a rearward direction per arrow 205 to a forward direction per arrow 207. As full engagement of the teeth occurs, the rack 67 shifts to compress the resilient means at a forward end of the rack, after which full force is transferred to the rack support means, and thence to the rotor. Clearly, the above description occurs in a fraction of a second and results in negligible fluctuation of driving force applied to the rotor.

The pinion and rack teeth as shown both have oblique tooth tiP end faces 199 and 202, inclined at similar angles 200 and 203 respectively which are approximately 70 degrees, but can be between 85 degrees and 45 degrees to longitudinal axes of the teeth. For manufacturing simplicity, it may be preferable to use conventional involute tooth forms for either the pinion or the racks, and thus if Preferred, only one set of teeth need be modified, that is either the pinion teeth or the rack teeth. If the pinion teeth are modified, geometry of the pinion teeth is as follows. The pinion tooth has a leading end portion 212 and a trailing end portion 213 with respect to a direction of rotation of the pinion gear, shown per arrow 16. The leading end portion is spaced at a radial distance 215 from the pinion axis 21, which is greater than spacing 216 of the trailing end portion 213 from the pinion axis. Thus the tip end face 199 of the pinion effectively has a clearance angle similar to a clearance angle of a rotating single Point cutting tool. Similarly, the rack tooth 195 has a leading end portion 217 and a trailing end portion 218 with respect to direction of movement of the rack under forward driving load. i.e. per the arrow 207. The leading end portion 217 is spaced at a distance from the rack axis, not shown, which is less than a similar spacing of the trailing end portion from the rack axis.

Because the tip end faces of the rack teeth are asymmetrical, the profile of the outer cam surface 32 is similarly asymmetrical as seen in FIG. 6. The outer cam surface 32 has a geometrical profile which reflects a locus of contact between tooth tips of a non-engaged rack sweeping past and contacting the outer surface, while a diametrically opposed rack is engaged with the pinion means. The process of generation of the geometrical profile of the surface 32 follows standard tooth profile generation practice and is not discussed further It is added that tightly controlled clearances are necessary to ensure smooth meshing.

It appears that, because the inwardly projecting trailing end portions of the rack teeth sweeping the surface 32 are displaced towards the right hand side of respective tooth axes as seen in FIG. 6, the outer surface 32 of the cam means is enlarged towards the right hand end of the cam means when compared with the left hand side. Thus, with respect to rotation of the pinion 19, the cam profile resembles to some extent a highly cambered aerofoil section in which a leading end thereof, designated 220, has a greater cross-sectional area than a trailing end thereof, designated 221. Clearly, in this definition the leading end is approached and passed by a particular Pinion tooth prior to the trailing end. Because the inner cam surface 31 is concentric with the axis 21, the outer cam surface 32 is disposed at a greater radial distance 223 from the pinion axis 21 adjacent the leading end 220 thereof than an equivalent radial distance 224 adjacent the trailing end 221 thereof.

OPERATION

The apparatus 10 operates generally similarly to the apparatus described in the aforesaid Kazuta patent, with important exceptions as previously referred to, and as briefly described as follows. Referring to Figure the input or pinion shaft 12 is rotated per arrow 16 and is engaged with the rack 65 which compresses the resilient member 98 so that the rack 65 moves into the recess end portion 93 to contact the end face thereof. Force from the pinion is transferred as the resultant force vector 175 through the point of contact 177, which results in rotation of the rotor 14. If an outwards force is applied to the gear shift connector 164, the rotor mounting means 37, and with it the rotor, move outwardly radially along the axis 38 so as to increase the spacing between the axes 19 and 35, to eventually attain the widest axial spacing 180 as shown in FIG. 5. This represents the widest gear ratio. In both FIGS. 1 and 5, the rack support means 71 is shown stationary at a limit of its travel from the pinion axis 19.

Referring to FIG. 6, after rotation of the pinion axis through the angle 183, the racks have swung through an angle of approximately 45 degrees as shown, and force from the pinion to the rack 65 is rapidly decreasing to zero, while force on the rack 67 is rapidly increasing to generate the resultant force 187 which passes closely adjacent the point of contact 189 of the driving side outer portion 188 with the engaging surface 132. It can be seen that, irrespective of whether the racks are in a wide ratio position, or a narrow ratio position, fully engaged by the pinion, or partially engaged by the pinion, the point of contact of the rack support carrying that rack is essentially intersected by a resultant force vector generated by force between the pinion teeth and a Particular rack tooth in contact.

It is to be understood that, if the direction of rotation of the input shaft 12 were reversed, so that power was applied to the shaft 12 in a direction opposite to the arrow 16, the angle of the tips of the teeth of the pinion and/or the racks would similarly be reversed. Also, if the input power were applied to the rotor 14, corresponding changes in the angle of the teeth would be required, depending on the direction of rotation.

It can be seen that the four racks function unitarily as an internal ring gear of varying diameter to vary gear ratio between the input pinion and the output rotor.

ALTERNATIVES

In the previously described embodiment, the rack teeth, eg the teeth 70 of the rack 66, contact the outer cam surface 32 of the cam means 26 as the rack sweeps past the cam means. Consequently, due to the shape and intermittent manner of contact of the rack teeth, relatively high bearing forces, resulting in corresponding wear, can be generated between the rack teeth and cam outer surface. An alternative embodiment to be described in FIGS. 8 through 11 provides means to prevent contact between the rack teeth and the cam outer surface, thus relieving this potential source of wear. Furthermore, FIGS. 12–16 shows two means of series coupling of two or more generally similar apparatus of the invention to increase available gear ratio therefrom.

FIGS. 8 THROUGH 10

Many of the components of an alternative embodiment 240 of the apparatus can be essentially identical to those in the previously described apparatus 10 of FIGS. 1 through 7. Consequently, components that have essentially identical structure are designated by the same numerical reference. Alternative components which, while functioning similarly, are structurally different are designated with the same numerical reference as used previously in FIGS. 1 through 7, followed by .1 or .2.

Figure 8:
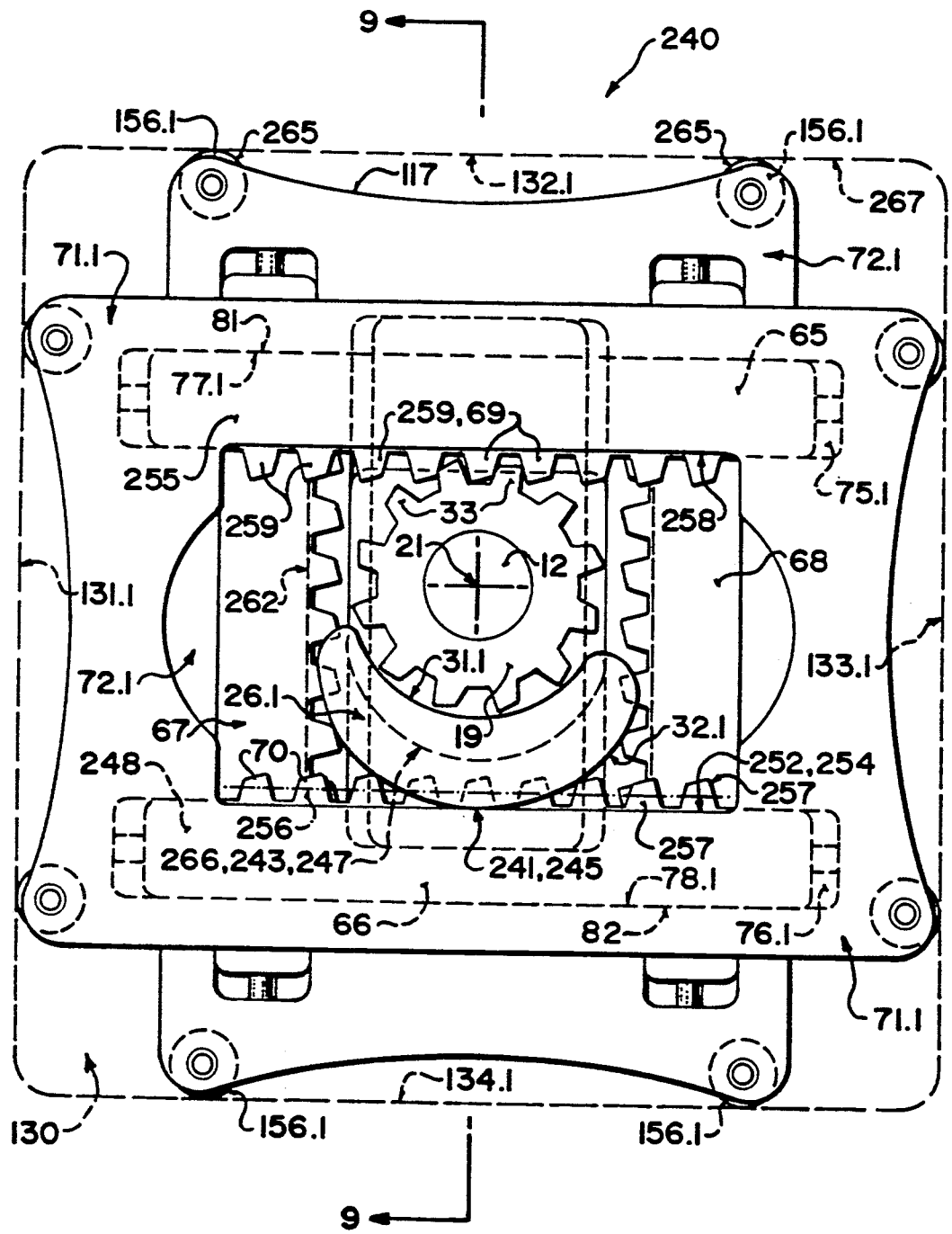
FIG. 8 is a simplified, fragmented, partially diagrammatic, sectional side elevation of an alternative embodiment of a Power transmission apparatus according to the invention, the alternative embodiment being adapted to relieve wear of rack and cam means, and also being adapted for series coupling to similar apparatus, some portions of the apparatus being exaggerated in size or omitted for clarity from the drawings, the apparatus being shown in a narrowest gear ratio setting generally similar to FIG. 1.
Figure 10:
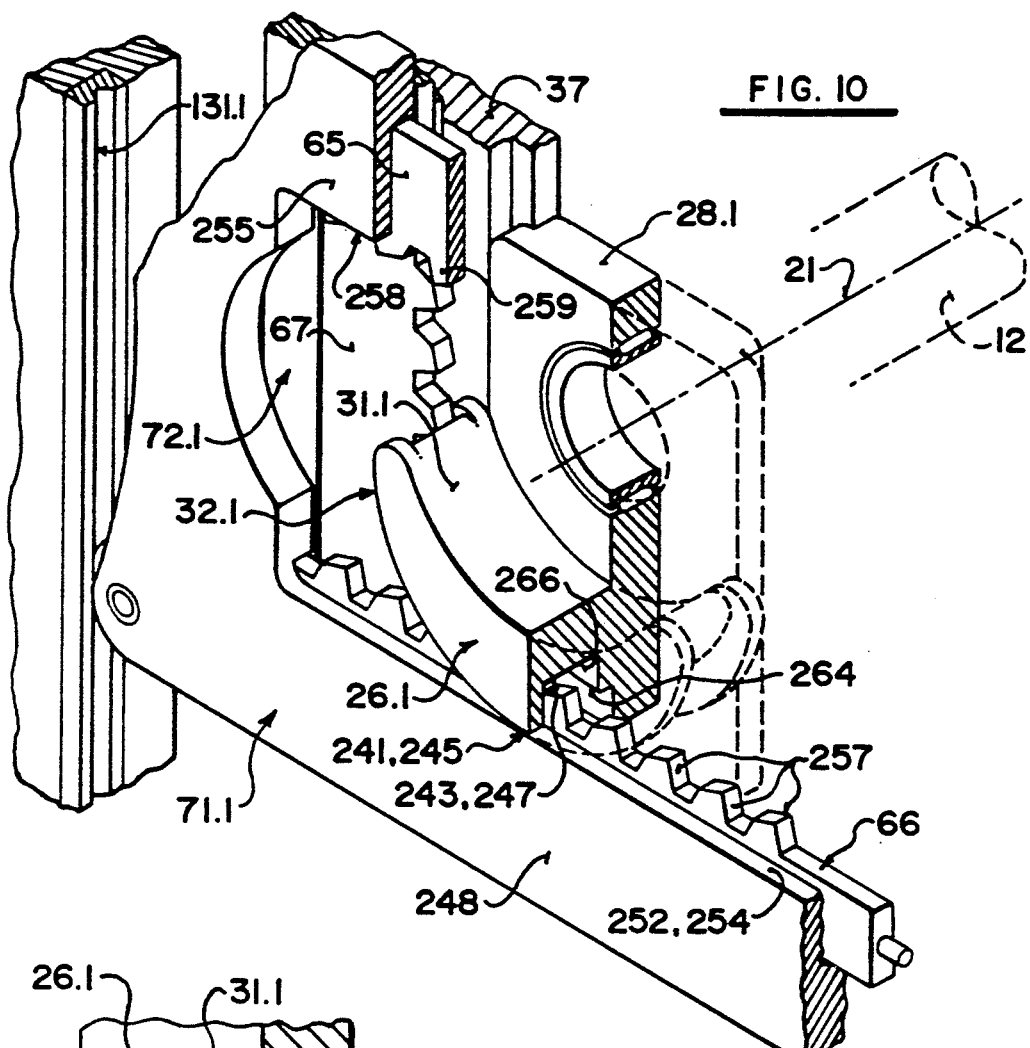
FIG. 10 is an isometric view an alternative cam means of the embodiment of FIGS. 7 and 8, portions of an adjacent rack, support means and associated structure being shown.
Figure 11:
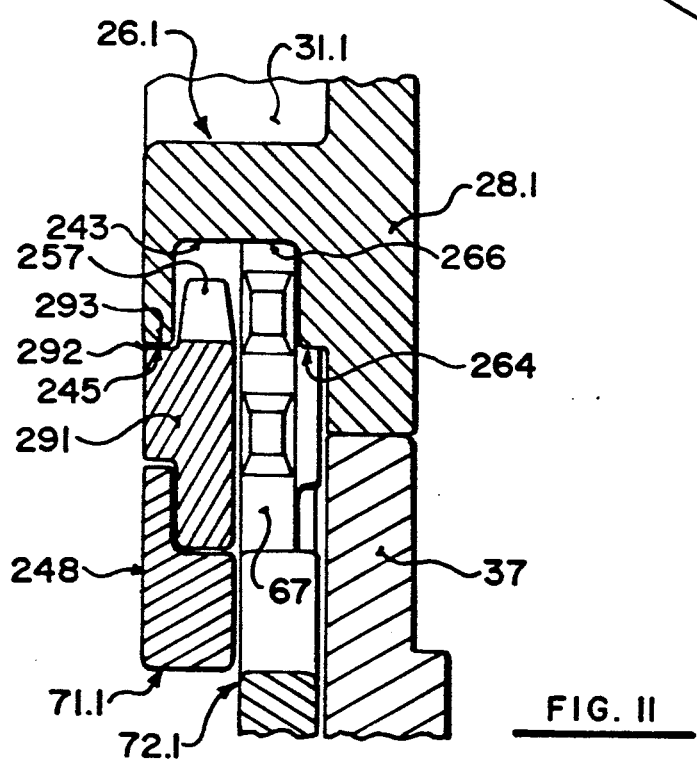
FIG. 11 is a simplified, fragmented cross-section generally similar to,, FIG. 9, of an alternative embodiment of a rack track integral with a rack, some adjacent being shown.

Referring to FIGS. 8 and 10, an alternative cam means 26.1 has a concavely curved inner cam surface 31.1 and a convexly curved outer cam surface 32.1. The cam means 26.1 extends from its cam mounting means 28.1 which journals the pinion shaft 12. As before, the pinion 19 has pinion teeth 33 which sweep closely adjacent to the inner cam surface 31.1 when there is relative rotation therebetween. In contrast with the previous embodiment, the cam outer surface 32.1 has a first guide Portion 241 and a first relieved portion 243. As seen in FIG. 8, the guide portion of the cam means has a first contact surface 245 which is generally parallel to a clearance surface 247 of the relieved portion. The contact surface 245 is functionally equivalent to the outer surface 32 of the cam 26 of FIG. 1, and thus has a closely controlled profile as previously described. In contrast, the clearance surface 247 merely provides clearance for teeth of the rack means as will be described, and has a profile which is less critical.

Figure 9:
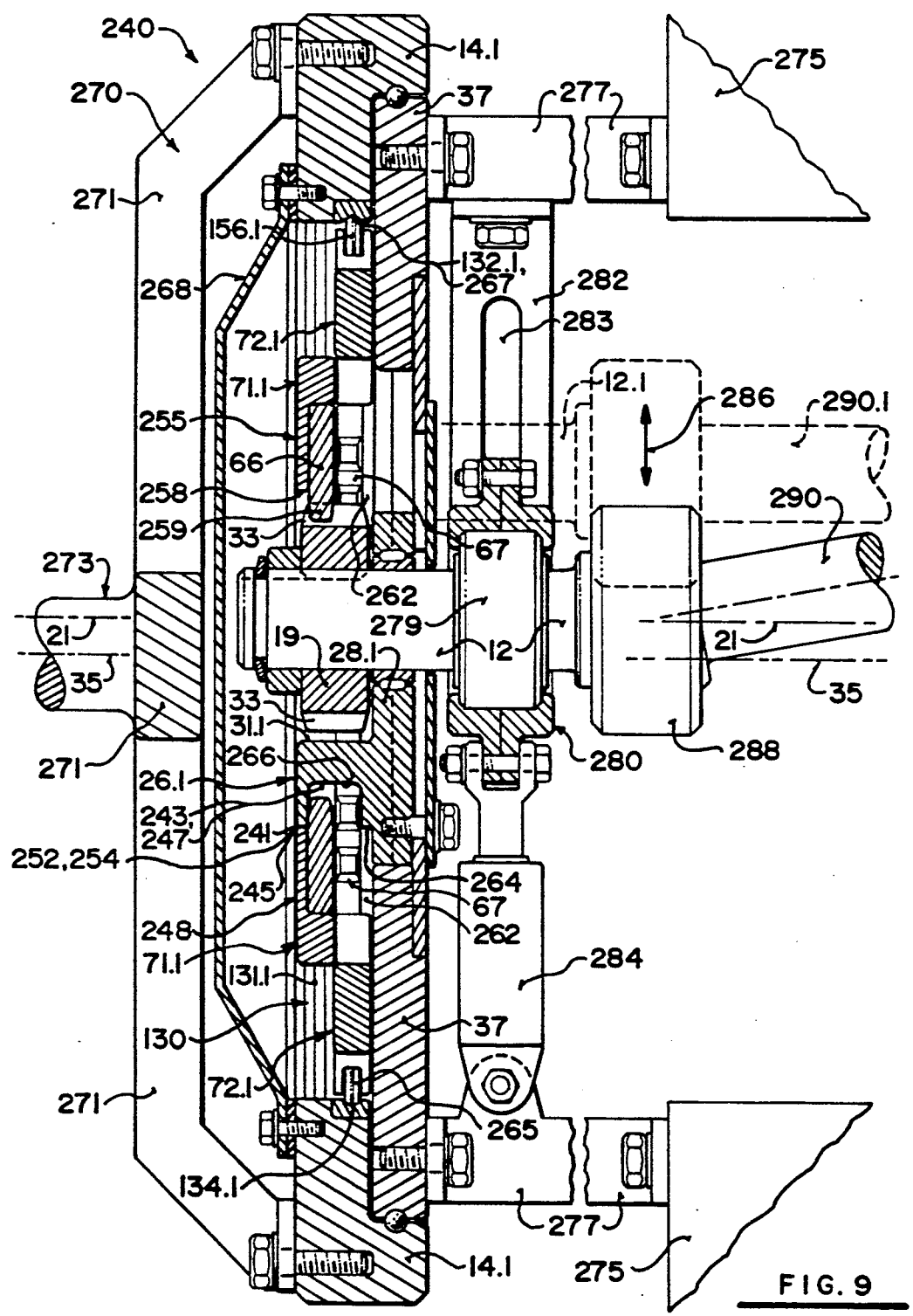
FIG. 9 is a simplified, fragmented diagrammatic section on Line 9—9 of FIG. 8, some portions being exaggerated in size or omitted from the drawings for clarity, the apparatus being shown in the narrowest gear ratio.

As best seen in FIGS. 8 and 10, the contact surface 245 of the guide portion 241 is disposed radially outwardly of the clearance surface 247 of the relieved portion 243 with respect to the pinion axis 21. Furthermore, as best seen in FIGS. 9 and 10 the contact surface is displaced to one side of the relieved portion in direction of the pinion axis.

The pinion gear 19 engages in sequence toothed gear racks 65 through 68 which are mounted as oppositely disposed rack pairs 65 and 66, and 67 and 68 as Previously described. In the alternative main embodiment, the racks are essentially the same as those in the first embodiment of FIGS. 1 through 7. Similarly, the racks 65 and 66 are mounted in a first rack support means 71.1, and the racks 67 and 68 are mounted in a second rack support means 72.1. The rack support means mount the racks to transfer power between the rotor 14 and the pinion gear 12 as previously described, but have also additional structure as will be described.

The rack support means 71.1 and 72.1 are generally similar, and thus the rack support means 71.1 for the toothed racks 65 and 66 only will be described. The rack support means 71.1 has a Pair of recesses 75.1 and 76.1 disposed on opposite sides of the support means and spaced apart on opposite sides of the pinion gear 19. The recesses 75.1 and 76.1 retain the racks 65 and 66 therein and have outer bearing surfaces 77 1 and 78.1 to engage outer bearing surfaces 81 and 82 of the racks 65 and 66 respectively. The recess 76.1 has a recess rear face portion 248 which is generally similar to the recess portion 147, as best seen in FIG. 3. In contrast with the face Portion 147 of FIG. 3, the recess rear face portion 248 herein has a rear edge portion that is critically dimensioned and positioned to provide a rack track 252 associated with the rack 66 fitted in the respective recess 76.1. As best seen in FIG. 8, the rack track 252 of the gear rack 66 has a straight contact surface 254 disposed parallel to a pitch line 256 of rack teeth 257 of the gear rack. Also, the contact surface 254 of the rack track 252 is disposed radially outwardly of the rack teeth 70 with respect to the pinion axis 21, that is the contact surface 254 is disposed inwardly of the troughs of or the clearances between, adjacent rack teeth, so that the surface 254 is clear of the Pinion teeth when the rack 66 engages the pinion gear 19. The location of the contact surface 254 is critical, and while it is shown herein to be straight, i.e. planar, it could be provided with a specific profile to cause additional movement of the rack support means for specific purposes.

The recess 75.1 has a similar recess rear face portion 255 having second rack track 258 generally adjacent rack teeth 259 of the toothed track 65. It can be seen in FIG. 9 that the track 258 is clear of the pinion teeth 33 engaging the rack teeth 259.

As best seen in FIGS. 9 and 10, the contact surface 254 of the rack track 252 (associated with the rack 66) is in contact with the contact surface 245 of the guide portion 241 of the cam while the opposite rack 66 meshes with the Pinion gear 19, the pinion gear not shown in FIG. 10. It can be seen that the rack track 252 is positioned relative to the rack teeth 257 so as to contact the guide portion when the rack teeth pass through the relieved portion, so as to prevent contact between the rack teeth and the cam outer surface. Thus, in contrast with the previous embodiment, wear of the cam surface and the rack teeth is reduced considerably by preventing contact therebetween. Thus, it can be seen that the guide portion and the relieved portion of the cam outer surface and the respective rack track extending generally adjacent teeth of each toothed rack serve as Preventing means for preventing contact between the rack teeth and the cam outer surface.

The second rack support means 72.1 has a second rack track 262 (broken line in FIG. 8), which, when appropriately oriented, similarly cooperates with a second guide portion 264 located on an opposite side of the cam means 26.1 from the first guide Portion 241. Teeth of the racks 67 and 68 of the second rack support means 72.1 pass through a second relieved Portion 266 of the cam means, the second relieved Portion 266 being displaced axially relative to, and co-planar with, the first relieved Portion 243 so as to be indistinguishable therefrom in shape. Thus, as best seen in FIG. 10, the first and second relieved portions 243 and 266 of the cam means are adjacent each other and blend smoothly together, and are sandwiched between the first and second guide portions 241 and 264 spaced on outer sides thereof having profiles which are identical to each other. Clearly, the clearance portions and guide Portions are "in phase" with each other, i.e. similar portions of the respective profiles are not angularly spaced apart circumferentially with respect to the pinion axis 21. Also, the recess rear face Portions of the rack support means 71.1 and 72.1 are on outer sides of the respective rack support means, and contain the four racks therein as "a package".

In the Previous embodiments, as best seen in FIG. 2, the "package" of the four racks and two rack support means were held within the main recess 130 of the rotor 14 by the outer annular plate 56, which partially enclosed the recess to retain the rack support means therein. In contrast, in the alternative embodiment 240, the four racks and two rack support means are held in place within the recess 130 of the rotor 14.1 by an alternative means associated with the rollers adjacent outer corners of the rack support means as follows.

Referring to FIG. 8, the second rack support means 72.1 has the driving side 117 fitted with a pair of journalled rollers 156.1 at outer Portions or corners thereof, the rollers contacting the engaging surface 132.1 of the recess 130 in the rotor 14.1. The support means 72.1 has four such rollers which are identical, and thus two rollers only will be described, namely the rollers on the left hand side of FIG. 8.

Referring to FIG. 9, the upper roller 156.1 has a V-sectioned periphery 265, which engages a complementary V-sectioned recessed guide track 267 in the engaging surface 132.1 of the rotor. When the periphery 65 of the roller engages the complementary guide track 67, it is clear that the roller is restrained for movement only along the track 267 of the engaging surface, with essentially negligible lateral movement relative to the track, that is along the axis 21 of the pinion. Referring again to FIG. 8, the rollers 156.1 on the opposite lower side of the support means 72.1 have similar V-sectioned peripheries engaging a similar V-sectioned engaging surface 134.1 of the rotor. Similarly, the rollers for the first rack support means 71.1 guide the first rack support means along complementary recessed guide tracks in the engaging surfaces 131.1 and 133.1. Thus, it can be seen that the rollers located on the driving side outer portions of the rack support means have flange means i.e. the peripheries, to facilitate tracking of the rollers thereon. Correspondingly, the engaging surfaces 132.1 of the rotor have guide tracks 267 complementary to the flange means of the rollers to maintain co-planar movement of the support means within the rotor.

As seen in FIG. 9, the recess 130 of the outer face of the rotor 14.1 is protected from contamination by an outer plate 268 secured to an outer periphery of the rotor. This is a substitute for the plate 56 of FIG. 2 which also reduced contamination of the gears. An alternative output means or spider means 270 is secured outwardly of the plate 268 and has a plurality of spokes 271 connected to a main shaft 273 which is mounted concentrically with the rotor 14.1, so as to be concentric with the rotor 35. The shaft 273 serves as output from or input into the device, and can be used to couple to similar apparatus as will be described with reference to FIGS. 12 through 16.

For normal one stage transmission applications or for coupling two or more similar apparatus together, the apparatus 240 is secured to an engine crankcase or bell housing 275 by a plurality of brackets 277, two such brackets being shown in FIG. 9. The pinion shaft 12 is journalled in a main thrust bearing 279 which is mounted in a thrust bearing housing 280, which is in turn mounted on a bearing guide 282 secured to the brackets 277. The bearing guide 282 has a bearing guide recess 283 which permits lateral movement of the bearing housing 280 along the recess. A linear actuator 284, such as a hydraulic cylinder, extends between one bracket 277 and the bearing housing 280. The extension and retraction of the actuator 284 shifts the thrust bearing 278 along the recess 283 per double-headed arrow 286, which results in corresponding lateral movement of the pinion shaft 12. This pinion shaft movement varies spacing between the pinion axis 21, and the rotor axis 35, thus varying gear ratio of the transmission apparatus as previously described.

Lateral movement of the pinion shaft is accommodated by a universal joint or constant velocity joint 288 which connects the pinion shaft 12 to an intermediate shaft 290. An opposite end of the intermediate shaft 290 is mounted with a similar constant velocity joint or a universal joint, shown in FIG. 12 but not shown in FIG. 9, which receives power from an output shaft of a prime mover, such as an engine, not shown in FIG. 9. Thus, the intermediate shaft 290 is an intermediate shaft disposed between a Pair of constant velocity joints, and functions similarly to the drive shaft of a front wheel drive automobile. To accommodate variable length of the shaft 290, preferably at least one of the constant velocity joints at opposite ends of the shaft 290 is of the type known as Birfield-Rzeppa, or equivalents such as Tripot-type, which can accommodate change in effective length of the shaft 291.

FIG. 11

An alternative toothed rack 291 has an integral alternative rack track 292 with a contact surface 293 which contacts the surface 245 of the guide portion 245 of the cam means 26.1. The surface 245 of the cam means can be unchanged and the surface 293 is disposed radially outwardly of the rack teeth with respect to the pinion axis, not shown, as before. Clearly, the recess rear face portion 248 of the rack support means 71.1 does not provide a rack track and is relieved to avoid interference with the rack 291. Clearly, in this alternative the rack 291 has a lateral projection which extends along a sidewall of the rack 291 clear of the pinion teeth and functions similarly to the rack track 252 of FIGS. 8-10. Because the rack 291 is resiliently mounted for limited movement within its respective recess, when the rack is loaded there can be slight longitudinal movement of the rack track relative to the rack mounting means, which can be a disadvantage in some applications.

FIGS. 12 THROUGH 14

Figure 12:
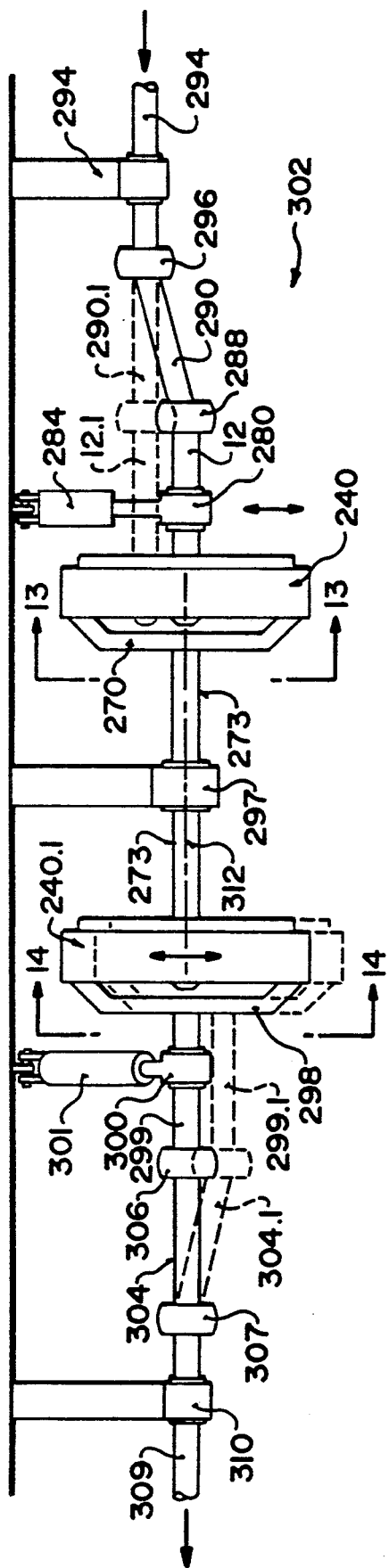
FIG. 12 is a simplified diagram of two alternative embodiments according to the invention which are generally similar to that of FIGS. 8-10, the two apparatus being shown coupled together in series in a first manner so as to overall gear ratio from that of a single apparatus.

FIG. 12 is a diagram showing a first manner of series coupling of a pair of essentially identical variable speed transmission apparatus 240 and 240.1 which are generally similar to that described in FIGS. 8 through 10, although a spider means could be fitted to the apparatus 10 of FIGS. 1-7 to function equivalently.

Figure 13:
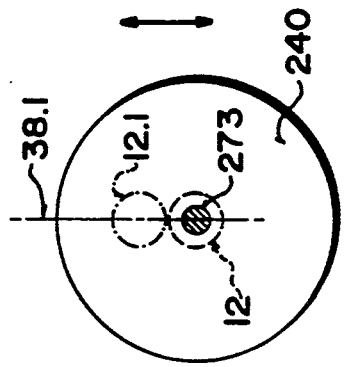
FIG. 13 is a simplified diagram on line 13—13 of FIG. 12.

The two apparatus 240 and 240.1 of a first combination 302 are connected together by the main shaft 273 and are supported and journalled for rotation about a main axis 312 as follows. A bearing support and bearing 294 journals a main input shaft 295 which supplies power to the pinion shaft 12 through the intermediate shaft 290, which is coupled to the shafts 295 and 12 through universal joints or constant velocity joints 296 and 288 respectively. The linear actuator 284 cooperates with the thrust bearing housing 280 as previously described except that the actuator 284 in FIG. 12 is located on an opposite side of the apparatus as shown in FIG. 9. The actuator 284 has a vertical axis of extension and retraction as previously described, and the bearing guide for the thrust bearing housing is omitted in FIG. 12. Clearly, full retraction of the actuator moves the shafts 12 and 290 upwardly to attain the broken outline positions 12.1 and 290.1 for a maximum gear reduction, that is the widest ratio. The axis of the linear actuator 284 is aligned with the cam axis 38.1 which determines direction of movement between the pinion axis and rotor axis of the embodiment 240. In FIG. 13, movement of shaft is shown along the cam axis 38.1 of the embodiment 240, to attain the upper broken outline position 12.1.

Figure 14:
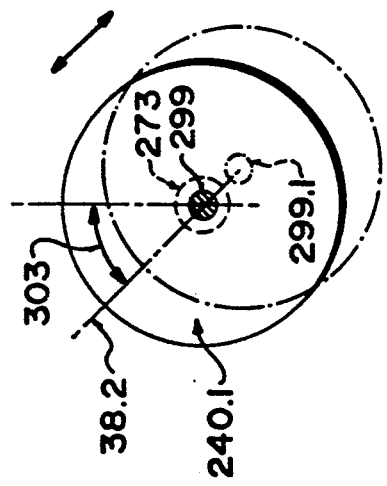
FIG. 14 is a simplified diagram on line 14—14 of FIG. 12, FIG. 15 generally similar to FIG. 12, and shows a second manner of coupling together two similar apparatus in series.

Output from the first apparatus 240 is transferred via the spider means 270 to the main shaft 273, the shaft 273 being supported in a bearing support and bearing 297 termed the main bearing. The shaft 273 serves as a input shaft into the apparatus 240.1 and is equivalent to the pinion shaft 12 as previously described. Output from the apparatus 240.1 is similarly through a spider means 298 and an output shaft 299, the shaft 299 being journalled in a thrust bearing housing 300. The bearing housing 300 is in turn mounted on a linear actuator 301 which has an obliquely inclined axis of extension and retraction when compared with the actuator 284. As seen in FIG. 14, the embodiment 240.1 has a cam axis 38.2 disposed at an angle 303 of 45 degrees to the vertical. Thus the linear actuators 284 and 301 are angularly displaced relative to each other when viewed along the axes of the pinion shafts.

An intermediate shaft 304 is disposed between a pair of constant velocity joints 306 and 307, and receives power from the shaft 299 through the joint 306. A final output shaft 309 is coupled to the joint 307 and is mounted in a bearing support and bearing 310 to provide an overall output from the coupled apparatus combination.

In operation, full extension of the actuator 301 moves the shafts 299 and 304 to broken outline positions 299.1 and 304.1, thus similarly shifting the rotor and increasing the reduction in gear ratio. In FIG. 14, the movement of the shaft 299 is along the axis 38.2 to attain the lower, obliquely disposed position. Clearly, as the cam axis 38.2 of the apparatus 240.1 is inclined at the angle 303 to the cam axis 38 1 of the apparatus 240, output from the two apparatus will be "out of phase" by 45 degrees. Thus there is a Phase angle of 45 degrees of rotor rotation between the racks of each apparatus, which bisects the 90 degrees of rotation which separates adjacent racks. Clearly, every 90 degree rotation of the rotor brings a separate rack into engagement with the pinion, and thus when considering overall output of the apparatus, the frequency of transfer of the drives between the pinion gears and racks of each apparatus is doubled and the forces being transferred are halved, so as to smooth transitions between adjacent racks, thus smoothing overall output and Power from combination.

In this first combination 302, it can be seen that the gear ratio of the first apparatus 240 is varied by moving the respective pinion gear by the actuator 284, and the output thereof is fed as the input in the second apparatus 240.1. Gear ratio of the second apparatus 240.1 is varied by shifting the rotor thereof radially by the actuator 301 moving the shaft 299 and the spider 298, because the apparatus 240.1 has a fixed pinion shaft axis i.e. the shaft 273. This contrasts with the apparatus 240 in which the rotor has a fixed axis and the input or pinion shaft thereof can be moved laterally by the actuator 284. Thus either the pinion shaft or the spider and the rotor are shifted laterally, resulting in equivalent variation of spacing between the pinion axis and the rotor axis, thus varying gear ratio in a similar manner.

It can be seen that if both apparatus 240 and 240.1 have an individual maximum gear ratio of 5:1, with input and output being as shown in FIG. 12, a maximum overall gear ratio of 25:1 can be attained. Clearly, addition of further similar apparatus can be used to increase gear ratio even further. To attain maximum gear ratio, the actuator 284 is contracted, and the actuator 301 is extended.

FIGS. 15 AND 16

Figure 15:
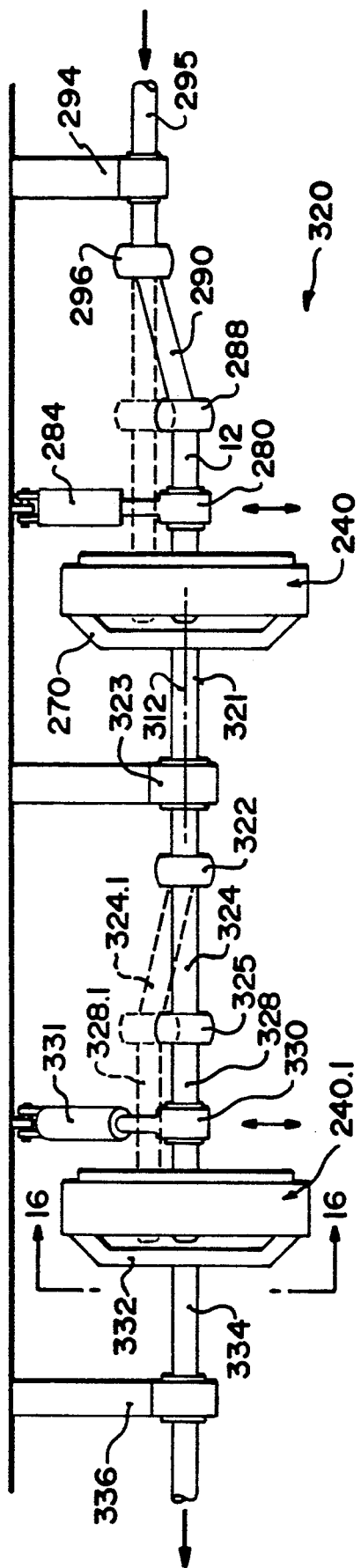

FIG. 15 shows a second manner of coupling two similar apparatus 240 and 241.1 together, to form a second combination 320. The first portion of the combination 320 adjacent the input is identical to that shown in FIG. 12, and includes a main input shaft 295, transmitting power to the pinion shaft 12 through the intermediate shaft 290 and the universal joints or constant velocity joints 296 and,.288 The first apparatus 240 is journalled for rotation about the main axis 312 on a main shaft 321 in a bearing support and bearing 323 Actuation of the actuator 284 moves the thrust bearing 280 which in turn moves the pinion axis with respect to the rotor axis, thus changing gear ratio of the first apparatus 240. The shaft 12 can be moved vertically upwardly to increase gear ratio as shown in FIG. 14 of the first embodiment and requires no further description.

Figure 16:
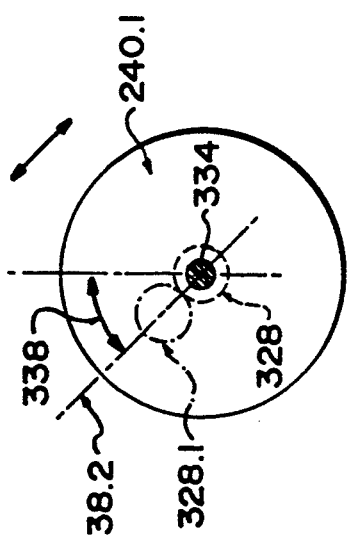
FIG. 16 is a simplified diagram on line 16—16 of FIG. 15.

The shaft 321 extending from the spider means 270 is connected to a constant velocity joint 322, through an intermediate shaft 324 to another constant velocity joint or universal joint 325. The second apparatus 240.1 has a pinion shaft 328 journalled in a thrust bearing 330 which is mounted on an obliquely inclined actuator 331. The shaft 328 is connected to the joint 325, and thus receives power from the first apparatus. Output from the second apparatus is through a spider means 332, which is in turn journalled on an output shaft 334 carried in a bearing and support means 336 As also seen in FIG. 16, retraction of the actuator 331 shifts the shaft 328 obliquely to a raised Position 328.1 shown in broken outline, and thus functions generally similarly to the obliquely inclined actuator 301 as described with reference to FIGS. 12 and 14. Clearly, retraction of the actuator 331 increases spacing between the Pinion axis and the rotor axis, thus increasing gear ratio As previously described, the actuator 301 and the cam axis 38.2 of the embodiment of the apparatus 240.1 are disposed at an angle 338 (45 degrees) to the actuator 284 and cam axis of the first apparatus 240. Thus, maximum gear ratio of the second combination is attained when both actuators 284 and 331 are retracted.

It can be seen that the combinations 302 and 320 disclose two similar apparatus coupled together in series, with equivalent dispositions of linear actuators cooperating with the pinion shafts of the second apparatus, that is the apparatus adjacent the output. Clearly, equivalent effects can be obtained by any such relative disposition of the rotor axes and the cam axes. Clearly, the actuators serve as first and second gear change means which Produce relative movement between the axes of the respective pinion gear and the respective rotor of the first and second apparatus respectively. To reduce fluctuations of forces on the apparatus and to smooth power output therefrom, preferably the relative movement between the pinion axis and the rotor axis of the first apparatus is angularly displaced from the relative movement of the Pinion axis and rotor axis of the second apparatus, as viewed along the axes of the pinions and rotors.

I claim:

1. A power transmission apparatus comprising:
   (a) a body,
   (b) a pinion gear having pinion teeth and being mounted for rotation about a pinion axis relative to the body,
   (c) a cam means having a curved outer surface, the cam means and the pinion gear being mounted for relative rotation therebetween,
   (d) first and second gear rack pairs, each gear rack pair having oppositely facing toothed gear racks which are spaced apart sufficiently to receive the pinion gear and cam means therebetween when the pinion gear fully engages rack teeth of at least one of the toothed gear racks,
   (e) preventing means for preventing contact between the rack teeth and the outer surface of the cam means,
   (f) first and second rack support means for supporting a respective pair of racks,
   (g) a rotor mounted for rotation about a rotor axis, the rotor having rotor engaging means for engaging the rack support means so as to transmit power therebetween.

2. A power transmission apparatus as claimed in claim 1, in which the preventing means for preventing contact is characterised by:
   (a) the cam outer surface having a guide portion and a relieved portion,
   (b) a plurality of rack tracks, each rack track extending generally adjacent rack teeth of a respective toothed rack,
   (c) the rack tracks being positioned relative to the respective rack teeth so as to contact the guide portion of the cam outer surface when the rack teeth pass the relieved portion, so as to prevent contact between the rack teeth and the cam outer surface.

3. A power transmission apparatus as claimed in claim 2, in which:
   (a) the rack track of each adjacent gear rack has a straight contact surface disposed parallel to a pitch line of the teeth of the gear rack.

4. A power transmission apparatus as claimed in claim 3, in which:
   (a) the guide portion has a contact surface disposed radially outwardly of a clearance surface of the relieved portion with respect to the pinion axis, and displaced to one side thereof in direction of the pinion axis,
   (b) the rack track has a contact surface disposed radially outwardly of the rack teeth with respect to the pinion axis so as to be clear of the pinion teeth when the toothed rack engages the pinion gear.

5. A power transmission apparatus as claimed in claim 4, in which:
   (a) each rack support means has a pair of parallel recesses disposed on opposite sides of the respective rack support means and spaced apart on opposite sides of the pinion gear,
   (b) each recess retains a respective gear rack portion having a rear edge portion providing the rack track for the rack fitted in the respective recess.

6. A power transmission apparatus as claimed in claim 5, in which:
   (a) the rack track is integral with the respective adjacent rack.

7. A power transmission apparatus as claimed in claim 1 in which:
   (a) each rack support means has a pair of parallel outer bearing surfaces disposed on opposite sides of the respective rack support means and spaced apart on opposite sides of the pinion gear, (b) each toothed gear rack has an outer bearing surface disposed on an edge opposite to teeth of the rack, the outer bearing surface of the gear rack being in engagement with an outer bearing surface of a respective rack support means.

8. A power transmission apparatus as claimed in claim 7 in which:
   (a) the toothed racks of each pair have oppositely disposed rack end portions,
   (b) each rack support means has a pair of parallel recesses disposed on opposite sides of the respective rack support means and spaced apart on opposite sides of the pinion gear, each recess retaining a respective gear rack and having a respective outer bearing surface to engage the outer bearing surface of a respective gear rack, each recess also having a pair of oppositely spaced recess end portions for receiving the rack end portions of the respective rack.

9. A power transmission apparatus as claimed in claim 8 in which:
   (a) each rack recess has a length greater than length of the respective rack retained therein,
   (b) resilient means cooperate with the rack support means and the rack to resiliently mount the rack for longitudinal movement relative to the respective rack recess.

10. A power transmission apparatus as claimed in claim 9 in which:
    (a) the resilient means centers a respective gear rack within a respective recess.

11. A power transmission apparatus as claimed in claim 8 in which:
    (a) each end portion of each recess has an inner edge portion disposed generally oppositely to the outer bearing surface of the rack recess, space between an inner edge portion and an adjacent and opposite outer bearing surface of the respective recess being essentially equal to width of a respective end portion of the rack, so as to essentially prevent the lateral movement of the rack relative to the rack recess.

12. A power transmission apparatus as claimed in claim 1 in which:
    (a) each rack support means has oppositely disposed driving sides disposed generally normally to the rack pairs mounted thereon, each driving side having a driving side inner portion and two driving side outer portions spaced on opposite sides of the respective driving side inner portion, the driving side outer portions projecting outwardly further from the respective driving side inner portions relative to the pinion gear.

13. A power transmission apparatus as claimed in claim 12 in which:
    (a) a resultant force vector from contact between the pinion gear and the respective rack passes closely adjacent a point of contact between an adjacent driving side outer portion and the respective engaging surface of the rotor.

14. A power transmission apparatus as claimed in claim 12 in which:
    (a) the driving side outer portions have bearing means to reduce friction and wear between the rack support means and the engaging surfaces of the rotor.

15. A power transmission apparatus as claimed in claim 14 in which:
    (a) the bearing means includes a roller journalled for rotation relative to the rack support means and adapted to contact the engaging surface of the rotor.

16. A power transmission apparatus as claimed in claim 15 in which:
    (a) the rollers having flange means on peripheries thereof,
    (b) the engaging surfaces having guide tracks complementary to the flange means of the rollers to maintain co-planar movement of the support means within the rotor.

17. A power transmission apparatus as claimed in claim 1 in which:
    (a) the pinion gear and gear racks each have teeth, some of which having obliquely inclined tooth tip end faces which generate forces on each other if opposing tooth tips contact each other momentarily prior to full engagement with each other, the oblique forces shifting the rack teeth generally tangentially relative to the pinion teeth immediately prior to engagement so as to facilitate meshing of the teeth.

18. A power transmission apparatus as claimed in claim 17 in which:
    (a) each tooth with an obliquely inclined tooth tip end face has a main longitudinal axis, the tip end face being inclined at an angle to the main axis within a range of between 85 degrees and 45 degrees.

19. A power transmission apparatus as claimed in claim 1 further including:
    (a) a pinion shaft mounting the pinion gear for mutual rotation about the pinion axis relative to the body,
    (b) a cam mounting means journalling the pinion shaft and connected to the cam means so that an inner surface of the cam means is at a fixed distance from the pinion gear axis, so as to permit teeth of the pinion gear to clear the inner surface of the cam means during the relative rotation therebetween.

20. A power transmission apparatus as claimed in claim 19 in which:
    (a) the body includes inner and outer body side members which are spaced apart sufficiently to receive therebetween the first and second gear rack pairs, the pinion gear and the rotor, the body side members engaging the rotor to permit relative movement therebetween and having aligned central openings to receive the pinion shaft to pass therethrough.

21. A power transmission apparatus as claimed in claim 19 further characterized by:
    (a) a gear ratio change means for varying spacing between the rotor axis and the pinion axis so as to vary gear ratio between the pinion shaft and the rotor, the gear ratio change means cooperating with the rotor and the pinion gear,
    (b) the gear ratio change means including a rotor mounting means which cooperates with the cam mounting means to permit relative movement between the cam mounting means and the rotor mounting means,
    (c) the rotor being journalled on the rotor mounting means for relative rotation about the rotor axis.

22. A power transmission apparatus as claimed in claim 1 in which:
    (a) the rotor has an annular bearing surface concentric with the rotor axis, and the transmission further includes:

(b) a rotor mounting means having a rotor bearing surface complementary to the annular bearing surface of the rotor for mounting the rotor thereon, the rotor mounting means being non-rotatably located relative to the cam means.

23. A power transmission apparatus combination, comprising generally similar first and second power transmission apparatus, each transmission apparatus comprising:
   (a) a body,
   (b) a pinion gear mounted for rotation about a pinion axis relative to the body,
   (c) a cam means having a curved outer surface, the cam means and the pinion gear being mounted for relative rotation therebetween,
   (d) first and second gear rack pairs, each gear rack pair having oppositely facing toothed gear racks which are spaced apart sufficiently to receive the pinion gear and cam means therebetween when the pinion fear fully engages at least one of the toothed gear racks, and the outer surface of the cam means is generally adjacent at least one of the oppositely facing toothed gear racks,
   (e) first and second rack support means for supporting the first and second gear rack pairs respectively against lateral movement of the rack pair relative to the respective support means so as to ensure full engagement between the pinion gear and respective racks sequentially as required,
   (f) a rotor mounted for rotation about a rotor axis, the rotor having rotor engaging means for engaging the first and second rack support means so as to transmit power therebetween; the combination being further characterized by:
   (g) the two apparatus being coupled together in series so that the apparatus combination has an overall gear ratio between an input of one apparatus, and an output of the remaining apparatus,
   (h) the first and second apparatus having first and second gear change means respectively to produce relative movement between the axes of the pinion gear and the rotor of the first and second apparatus respectively, the said relative movement of the first apparatus being angularly displaced from the said relative movement of the second apparatus as viewed along the axis.

24. A power transmission apparatus as claimed in claim 23, in which:
   (a) the rotor of the first apparatus and the pinion gear of the second apparatus are operatively connected together for rotation about a main axis of the combination,
   (b) the pinion gear of the first apparatus being movable laterally of the main axis to change gear ratio of the first apparatus,
   (c) the rotor of the second apparatus is movable laterally of the main axis to change gear ratio of the second apparatus.

25. An apparatus as claimed in claim 24, in which:
   (a) the rotor of the first apparatus has a spider means connected thereto, a main shaft extending from the spider means along the main axis,
   (b) the pinion gear of the second apparatus is rigidly connected to the main shaft connected to the spider means of the first apparatus to provide a direct mechanical connection therebetween,
   (c) a main bearing being disposed between the two apparatus, the main bearing journalling the main shaft for rotation to facilitate mounting of the apparatus on opposite ends thereof.

26. An apparatus as claimed in claim 23, in which:
   (a) the rotors of the first and second apparatus are journalled for rotation about a main axis of the combination,
   (b) the pinion gear of the first apparatus is movable laterally of the main axis to change gear ratio of the first apparatus,
   (c) the pinion gear of the second apparatus is movable laterally of the main axis to change gear ratio of the second apparatus,
   (d) the rotor of the first apparatus is operatively connected to the pinion gear of the second apparatus to transmit rotation therebetween.

27. An apparatus as claimed in claim 23 in which each transmission apparatus further including:
   (a) preventing means for preventing contact between teeth of the gear racks and the outer surface of the cam means.

* * * * *